United States Patent
Guo et al.

(10) Patent No.: US 10,889,681 B2
(45) Date of Patent: Jan. 12, 2021

(54) POLYURETHANE CATALYST AND APPLICATION THEREOF

(71) Applicant: JIANGSU OSIC PERFORMANCE MATERIALS CO. LTD., Jiangsu (CN)

(72) Inventors: Yi Guo, Jiangsu (CN); Shaojuan Huang, Jiangsu (CN); Haoming Zhang, Jiangsu (CN)

( * ) Notice: Subject to any disclaimer, the term of this patent is extended or adjusted under 35 U.S.C. 154(b) by 0 days.

(21) Appl. No.: 15/540,485

(22) PCT Filed: Dec. 10, 2015

(86) PCT No.: PCT/CN2015/096944
§ 371 (c)(1),
(2) Date: Jun. 28, 2017

(87) PCT Pub. No.: WO2016/107388
PCT Pub. Date: Jul. 7, 2016

(65) Prior Publication Data
US 2018/0273671 A1    Sep. 27, 2018

(30) Foreign Application Priority Data

Dec. 31, 2014  (CN) .......................... 2014 1 0851449
Dec. 31, 2014  (CN) .......................... 2014 1 0851978
Dec. 31, 2014  (CN) .......................... 2014 1 0852148

(51) Int. Cl.
*C08G 18/48*   (2006.01)
*C08G 18/22*   (2006.01)
(Continued)

(52) U.S. Cl.
CPC ............ *C08G 18/225* (2013.01); *B01J 31/00* (2013.01); *C08G 18/0823* (2013.01);
(Continued)

(58) Field of Classification Search
CPC .... B01J 31/00; C08G 18/0823; C08G 18/163; C08G 18/168; C08G 18/1808; C08G 18/1816; C08G 18/1825; C08G 18/1841; C08G 18/1858; C08G 18/2018; C08G 18/2027; C08G 18/2036; C08G 18/2063; C08G 18/2072; C08G 18/2081; C08G 18/209; C08G 18/225; C08G 18/244; C08G 18/3206; C08G 18/3228; C08G 18/3275; C08G 18/3281; C08G 18/4018; C08G 18/4072; C08G 18/42; C08G 18/4208; C08G 18/4263; C08G 18/48; C08G 18/4804; C08G 18/4825; C08G 18/4829; C08G 18/4854; C08G 18/4887; C08G 18/603; C08G 18/657; C08G 18/6622; C08G 18/664; C08G 18/6674; C08G 18/6677; C08G 18/6681; C08G 18/755; C08G 18/7614; C08G 18/7621; C08G 18/7664; C08G 18/7671; C08G 18/7685; C08G 2101/0008; C08G 2101/0025; C08G 2101/005; C08G 2101/0058; C08G 2101/0083; C08G 2410/00; C08J 9/127; C08J 9/141; C08J 9/144; C08J 9/145; C08J 2203/10; C08J 2203/142; C08J 2203/16; C08J 2203/182; C08J 2205/06; C08J 2205/10; C08J 2207/04; C08J 2375/08;
(Continued)

(56) References Cited

U.S. PATENT DOCUMENTS 3,075,926 A * 1/1963 Stewart ................. C08G 18/36
                                                            521/137
3,085,896 A     4/1963 Norman
(Continued)

FOREIGN PATENT DOCUMENTS

CA          663802       5/1963
CN         101067018    11/2007
(Continued)

OTHER PUBLICATIONS

Supplementary search report of European patent application EP15875066 dated Jul. 25, 2018 (EP national phase of PCT/CN2015/096944) + Cited References.
Office Action 1 of 2014108514499.
Office Action 2 of 2014108514499.
Office Action 3 of 2014108514499.
Translation of Office Action 1 of 2014108514499.
Translation of Office Action 2 of 2014108514499.
Translation of Office Action 3 of 2014108514499.
Translation of JP H09132625.
(Continued)

*Primary Examiner* — John M Cooney
(74) *Attorney, Agent, or Firm* — W&K IP

(57) ABSTRACT

A polyurethane catalyst comprises a sodium compound, the sodium compound being 1 to 60 wt % of the polyurethane catalyst by the mass percent, and further comprises a tertiary amine and/or pyridine compound. The sodium compound and the tertiary amine and/or pyridine compound achieve a synergistic effect; during the catalysis of the polymerization of isocyanate and polyalcohol, the speed of the polymerization reaction is increased; and the prepared polyurethane material has excellent physical properties, does not contain any heavy metal element at all, is an environment-friendly catalyst, solves the technical problem of ensuring environmental protection, safety and the catalytic efficiency of the polyurethane catalyst, and is particularly applicable to the preparation of polyurethane synthetic leather resin slurry, a polyurethane elastomer (prepolymer), a polyurethane coating, a polyurethane adhesive, a polyurethane composite material, flexible polyurethane foam, and a rigid polyurethane material.

10 Claims, No Drawings

(51) Int. Cl.
| | |
|---|---|
| C08G 18/75 | (2006.01) |
| C08G 18/18 | (2006.01) |
| C09D 175/08 | (2006.01) |
| C08G 18/40 | (2006.01) |
| B01J 31/00 | (2006.01) |
| C08G 18/66 | (2006.01) |
| C08G 18/76 | (2006.01) |
| C08G 18/16 | (2006.01) |
| C08L 75/08 | (2006.01) |
| C08G 18/20 | (2006.01) |
| C08G 18/32 | (2006.01) |
| C08G 18/65 | (2006.01) |
| C08J 9/14 | (2006.01) |
| C08G 18/08 | (2006.01) |
| C09J 175/00 | (2006.01) |
| C08G 18/42 | (2006.01) |
| C08G 18/24 | (2006.01) |
| C08G 18/60 | (2006.01) |
| C08J 9/12 | (2006.01) |
| C08G 101/00 | (2006.01) |

(52) U.S. Cl.
CPC ......... *C08G 18/163* (2013.01); *C08G 18/168* (2013.01); *C08G 18/1808* (2013.01); *C08G 18/1816* (2013.01); *C08G 18/1825* (2013.01); *C08G 18/1841* (2013.01); *C08G 18/1858* (2013.01); *C08G 18/209* (2013.01); *C08G 18/2018* (2013.01); *C08G 18/2027* (2013.01); *C08G 18/2036* (2013.01); *C08G 18/2063* (2013.01); *C08G 18/2072* (2013.01); *C08G 18/2081* (2013.01); *C08G 18/244* (2013.01); *C08G 18/3206* (2013.01); *C08G 18/3228* (2013.01); *C08G 18/3275* (2013.01); *C08G 18/3281* (2013.01); *C08G 18/4018* (2013.01); *C08G 18/4072* (2013.01); *C08G 18/42* (2013.01); *C08G 18/4208* (2013.01); *C08G 18/4263* (2013.01); *C08G 18/48* (2013.01); *C08G 18/4804* (2013.01); *C08G 18/4825* (2013.01); *C08G 18/4829* (2013.01); *C08G 18/4854* (2013.01); *C08G 18/4887* (2013.01); *C08G 18/603* (2013.01); *C08G 18/657* (2013.01); *C08G 18/664* (2013.01); *C08G 18/6622* (2013.01); *C08G 18/6674* (2013.01); *C08G 18/6677* (2013.01); *C08G 18/6681* (2013.01); *C08G 18/755* (2013.01); *C08G 18/7614* (2013.01); *C08G 18/7621* (2013.01); *C08G 18/7664* (2013.01); *C08G 18/7671* (2013.01); *C08G 18/7685* (2013.01); *C08J 9/127* (2013.01); *C08J 9/144* (2013.01); *C08J 9/145* (2013.01); *C08L 75/08* (2013.01); *C09D 175/08* (2013.01); *C09J 175/00* (2013.01); *C08G 2101/005* (2013.01); *C08G 2101/0008* (2013.01); *C08G 2101/0025* (2013.01); *C08G 2101/0058* (2013.01); *C08G 2101/0083* (2013.01); *C08G 2410/00* (2013.01); *C08J 9/141* (2013.01); *C08J 2203/10* (2013.01); *C08J 2203/142* (2013.01); *C08J 2203/16* (2013.01); *C08J 2203/182* (2013.01); *C08J 2205/06* (2013.01); *C08J 2205/10* (2013.01); *C08J 2207/04* (2013.01); *C08J 2375/08* (2013.01)

(58) Field of Classification Search
CPC ......... C08K 7/14; C08L 75/08; C09D 175/08; C09J 175/00
See application file for complete search history.

(56) References Cited

U.S. PATENT DOCUMENTS

| | | | |
|---|---|---|---|
| 3,986,911 | A | 10/1976 | Lerner |
| 4,080,345 | A | 3/1978 | Riemhofer |
| 4,191,815 | A | 3/1980 | Du Perez |
| 4,604,418 | A | 8/1986 | Shindo |
| 2004/0082712 | A1 | 4/2004 | Blount |
| 2006/0014846 | A1 | 1/2006 | Sparks et al. |
| 2006/0281827 | A1 | 12/2006 | Bonapersona |
| 2007/0259773 | A1 | 11/2007 | Burdeniuc |
| 2007/0259983 | A1 | 11/2007 | Burdeniuc |
| 2008/0234402 | A1* | 9/2008 | Lehmann ............ B01J 31/0204 521/118 |
| 2008/0274894 | A1* | 11/2008 | Thiede ................ C08G 18/482 504/308 |
| 2009/0088489 | A1 | 4/2009 | Terheiden et al. |
| 2010/0093882 | A1 | 4/2010 | Ohama |
| 2010/0130629 | A1* | 5/2010 | Kometani ............ A43B 13/04 521/128 |
| 2011/0184080 | A1 | 7/2011 | Schonberger |
| 2013/0261200 | A1 | 10/2013 | Doerr |
| 2014/0093675 | A1* | 4/2014 | Koesters ............ B29C 44/1276 428/71 |
| 2015/0094387 | A1 | 4/2015 | Wiltz, Jr. et al. |

FOREIGN PATENT DOCUMENTS

| | | |
|---|---|---|
| CN | 101070369 | 11/2007 |
| CN | 10124811 | 8/2008 |
| CN | 101257974 | 9/2008 |
| CN | 101397359 | 4/2009 |
| CN | 103732645 | 4/2014 |
| EP | 0003210 | 8/1979 |
| EP | 2360199 | 8/2011 |
| EP | 2890112 | 2/2016 |
| GB | 1529821 | 10/1978 |
| JP | H09132625 | 5/1997 |
| JP | 2001026629 | 1/2001 |
| JP | 3543277 | 7/2004 |
| JP | 2008037887 | 2/2008 |
| JP | 4457644 | 4/2010 |
| WO | WO2008/021034 | 2/2008 |
| WO | WO2014/156810 | 10/2014 |

OTHER PUBLICATIONS

Translation of JP 4457644.
Translation of JP 2001026629.
EPO Office Action of EP 15875066.1 dated Apr. 8, 2020.

* cited by examiner

POLYURETHANE CATALYST AND APPLICATION THEREOF

TECHNICAL FIELD

The present invention relates to a catalyst, in particular to a catalyst for preparing polyurethane and an application of the catalyst, and belongs to the technical field of synthesis of polyurethane materials.

BACKGROUND

Polyurethane is a general term about macromolecular compounds containing repeat carbamate groups on main chains; such macromolecular material can be used for manufacturing products including rubber, rigid and flexible foam plastics, adhesive agents, coatings, paints and the like, and is widely applied in many fields of buildings, automobiles, light industry, textiles, petrochemical industry, metallurgy, electronics, national defense, medical treatment, machinery and the like due to remarkable wear resistance, impact resistance, ultraviolet ray resistance and high and low temperature resistance. Flexible polyurethane foam plastic (flexible polyurethane foam for short) is the most widely used polyurethane product, has the properties of low density, good elastic recovery, sound insulation, air permeability, thermal insulation and the like and can be used as lamination composites of furniture cushion materials, vehicle seat cushion materials and various flexible paddings.

A polyurethane material is prepared by performing a catalytic reaction by the catalyst at a certain temperature with polyisocyanates, polyalcohol and other stabilizers as raw materials; and a kind of catalysts commonly used in synthesis of the polyurethane material are metal organic compounds, such organic metal catalysts are lead and mercury organic compounds at first, but have been listed as prohibited products because lead and mercury are both heavy metals, largely harm human bodies and can cause severe environmental pollution.

For this purpose, Chinese patent document CN101397359A discloses an amine catalyst for preparing a flexible polyurethane foam with low emission and re-catalysis stability, and the amine catalyst comprises at least one reactive amine catalyst and at least one organic potassium, zinc and/or tin compound and has better catalytic activity. Tin compounds are used in the catalyst as a component of the catalyst, so that the organic tin catalyst contains unreacted dibutyltin, and the like, and such by-products easily cause malformation or chronic intoxication of organisms, so that the catalyst has been listed for restricted use by developed countries such as European Union. However, if organic tin compounds are not added, and other organic compounds, such as potassium and/or zinc organic compounds, are used instead of tin compounds, the catalytic activity of the catalyst is obviously reduced; on one hand, reduction of reaction speed and prolonging of reaction time cannot be prevented even if the reaction temperature rises, and on the other hand, if people wants reaction speed of the catalyst approximately reaches the reaction speed of the tin catalyst, the dosage of the catalyst needs to be increased, for example, in synthesis of synthetic leather slurry, organic bismuth is used as complete substitute for dibutyltin dilaurate with a dosage being 4-5 times of the original dosage; whether the former scheme of prolonging reaction time and rising reaction temperature, or the latter scheme of increasing dosage of the catalyst is used, the synthesis cost of polyurethane material is increased to different extents, and even so, physical properties, such as tensile strength and tear strength, of polyurethane material catalytically synthesized by such catalyst, are obviously reduced; moreover, when a formula without a tin compound in the above document is used, the synthesized light-color polyurethane material easily turns yellow; and in addition, under the condition that a formula of raw materials for synthesizing polyurethane comprises water, bismuth or zinc organic compounds may be inactivated due to hydrolysis, so that the storage period of a composite material is shortened.

SUMMARY

Therefore, a technical problem to be solved in the present invention is that a catalyst without tin organic metals in the prior art is low in catalytic activity and a polyurethane material catalytically-synthesized with the catalyst has low properties, and the present invention provides an environmental-friendly polyurethane catalyst which has high catalytic activity and can be used for preparing a polyurethane material with physical properties.

In order to solve the technical problem, the present invention adopts the following technical scheme.

The present invention provides a polyurethane catalyst, and is characterized in comprising a sodium compound which accounts for 1-60 wt % by weight of the polyurethane catalyst.

The sodium compound is selected from a group consisting of sodium hydroxide, sodium carbonate, sodium bicarbonate, sodium benzoate, sodium formate, sodium acetate, sodium propionate, sodium butyrate, sodium valerate, sodium caproate, sodium caprylate, sodium 2-ethylhexanoate, sodium neodecanoate, sodium caprate, sodium salicylate, sodium laurate, sodium oleate, sodium maleate, sodium citrate, sodium oxalate, sodium methoxide, sodium cellulose, sodium carboxymethylcellulose, sodium hyaluronate, sodium alginate, sodium gluconate and any combination thereof. Further, the sodium compound is selected from a group consisting of sodium butyrate, sodium neodecanoate, sodium salicylate, sodium oleate, sodium citrate, sodium hyaluronate and any combination thereof.

The polyurethane catalyst further comprises a nitrogen compound, and the nitrogen compound is a tertiary amine compound and/or a pyridine compound. The nitrogen compound is selected from a group consisting of linear polyamine, heterocyclic polyamine, benzene ring polyamines and any combination thereof, and the nitrogen compound accounts for 5-70 wt % by weight of the polyurethane catalyst.

The nitrogen compound is selected from a group consisting of triethylenediamine, pentamethylenetriamine, 1,1'-[[3-(dimethylamino)propyl]imino]bis-2-propanol, pentamethyldiethylenetriamine, tetramethyldipropylenetriamine, N,N-dimethyl-1,3-propanediamine, 3-dimethylaminopropyl urea, (dimethylaminoethyl) ether, N,N-bi[3-(dimethylamino)propyl]-N',N'-dimethyl-1,3-propanediamine, hexadecyl amine, 2-[[3-(dimethylamino)propyl]methylamino] ethanol, 1,3,5-tris(3-(dimethylamino)propyl)-1,3,5-hexahydrotriazine, N,N-dimenthylethanolamine, N,N-dimethyl benzylamine, triethanolamine, diethanolamine, 1,8-diazabicyclo[5,4,0]undecenyl-7-ene, 6-dimethylamino-1-hexanol, N-methyldicyclohexylamine, cetylamine, tetramethylguanidine, 1-isobutyl-2-methylimidazole, 2-amino-α-[[2-(1,1-dimethylethoxy)-2-oxoethoxy]imino]-4-thiazoleaceticacid, O,O-diethylthiophosphate anhydride, N-ethyl morpholine, N-methylmorpholine, benzylamine, diethylaminoethanol, N,N'-diisopropylcarbodiimide, 1-ethyl-(3-dimethyllaminopropyl) carbodiimidehydrochloride, 1,2-dimethylimidazole, N-methylimidazole, 2,2-dimorpholinodiethylether, dimethyaminoethoxyethanol, 2-dimethylaminopyrdine, 2,4-diaminopyrimidine, 4,5-diaminopyrimidine, 2-methylaminopyridine, 4-dimethylaminopyridine, 2,4-bis(dimethylamino)pyrimidine-6-carboxylic acid, 1-(methylamino)-3-(4-methylpiperazine-1-yl)-2-propanol, amino piperazine hydrochloride, 2,2,4-trimethyl-1-oxa-4-aza-2-silacyclohexane, 1-(2-dimethylaminoethyl) piperazine, 1-(3-dimethylamino-propyl)-piperazine, (2-morpholinopyrid-4-yl)methanamine, 4-chloro-6-dimethylaminopyrimidine, N,N-dimethyl-1-(morpholin-2-yl) methanamine, N,N-dimethyl-1-[(2R)-morpholin-2-yl]methanamine, 4-methylmorpholine-2-methylamine, N,N-dimethyl(4-methyl-1-piperazinyl)ethanamine, hexahydro-1,3,5-trimethyl-S-triazin, 1,3,5-triethylhexahydro-S-triazine, N,N'-carbonyldiimidazole, dicyclohexylcarbodiimide, 3-(diethoxyphosphoryloxy), o-(7-azabenzotriazol-1-yl)-N,N,N,N'-tetramethyluroniumhexafluorophosphate, N-hydroxy-7-azabenzotriazole, bromo-tris-pyrrolidino-phosphoniumhexafluorophosphate, O-(benzotriazol-1-yl)-N,N,N',N'-tetramethyluroniumtetrafluoroborate, O—(N-succinimido)-1,1,3,3-tetramethyluronium tetrafluoroborate and any combination thereof.

Further, the nitrogen compound is selected from a group consisting of pentamethyldiethylenetriamine, 2-dimethylaminopyridine, N,N-dimethyl-1,3-propanediamine, triethylenediamine, 1,3,5-tris(3-(dimethylamino)propyl)-1,3,5-hexahydrotriazine, 1,8-diazabicyclo [5,4,0] undecenyl-7-ene, 2,2-dimorpholinodiethylether, (2-morpholinopyrid-4-yl)methanamine, 2,4-diaminopyrimidine, 1-(methylamino)-3-(4-methylpiperazine-1-yl)-2-propanol and any combination thereof.

The polyurethane catalyst further comprises a potassium compound which accounts for 2-50 wt % by weight of the polyurethane catalyst.

The potassium compound accounts for 2-20 wt % by weight of the polyurethane catalyst.

The potassium compound is selected from a group consisting of potassium hydroxide, potassium carbonate, potassium bicarbonate, potassium benzoate, potassium formate, potassium acetate, potassium propionate, potassium butyrate, potassium valerate, potassium caproate, potassium caprylate, potassium 2-ethylhexanoate, potassium neodecanoate, potassium caprate, potassium salicylate, potassium laurate, potassium oleate, potassium maleate, potassium citrate, potassium oxalate, potassium methoxide, potassium cellulose, potassium carboxymethylcellulose, potassium hyaluronate, potassium alginate, potassium gluconate and any combination thereof.

The potassium compound is selected from a group consisting of potassium benzoate, potassium laurate, potassium oleate, potassium citrate, potassium alginate, potassium cellulose and any combination thereof.

The polyurethane catalyst further comprises an organic solvent and a stabilizer, the organic solvent being represented by formula (1):

$$X—R—Y \quad (1)$$

wherein R is an alkyl group of $C_{1-20}$, a polyether group represented by formula (2), a nitrogen-containing group represented by formula (3), a nitrogen-containing group represented by formula (4), amide represented by formula (5) or amide represented by formula (6);

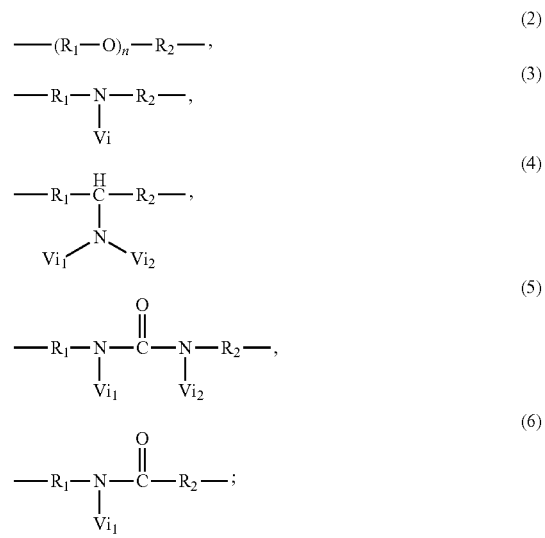

X and Y independently are H, OH, R or $R_1$;

n=1-100;

$R_1$ and $R_2$ independently are H or a linear, branched or cyclic, aliphatic or aromatic, saturated or unsaturated, unsubstituted or heteroatom-substituted hydrocarbon group having 1 to 10 carbon atoms; and $V_i$, $V_{i1}$ and $V_{i2}$ independently are H, OH or a polyether group represented by formula (2).

The invention further provides an application of the polyurethane catalyst in preparation of polyurethane synthetic leather resin slurry, a polyurethane elastomer, a polyurethane coating, a polyurethane adhesive, a polyurethane composite, a flexible polyurethane foam plastic or a rigid polyurethane material.

The present invention further provides an application of a sodium compound in preparation of a polyurethane catalyst.

Compared with the prior art, the technical scheme of the present invention has the following advantages.

(1) The polyurethane catalyst of the present invention comprises a sodium compound and a tertiary amine and/or pyridine compound which have synergistic effects, so that the speed of a polymerization reaction is increased when polymerization of isocyanate and polyalcohol is catalyzed by the catalyst; the reaction sequence of various reactants in a reaction system is reasonably allocated, so that isocyanate molecules and polyalcohol molecules react firstly; and besides, side reactions among isocyanate, polyalcohol and water, impurity molecules and broken small molecules in the reaction system are effectively controlled, so that a phenomenon that other small molecule compounds formed due to the side reactions are randomly entrained in the synthesized polyurethane molecule system, is effectively avoided. The polyurethane material catalytically synthesized with the polyurethane catalyst of the present invention has favorable physical properties including high yellowing resistance, high tear strength, high ageing resistance, high tensile strength and good elasticity, and can be used for preparing a polyurethane elastomer (prepolymer); with the catalyst provided by the present invention, liquid polyurethane material can have good mobility without gelation and caking, and has favorable wear resistance and toughness, thereby being suitable to be used as a catalyst for preparing polyurethane synthetic leather resin slurry and a polyurethane coating; the synthetic leather resin slurry can be used as a finishing agent for manufacturing artificial leather, suede-like fabric, synthetic leather, electrostatic flocking, superfine fibers, and the like, and the obtained product has favorable properties and resists deflection, ageing and wear; the polyurethane coating is strong in adhesion, high in elasticity and good in ageing resistance and can be used for finishing materials including high-grade woodenware, large engineering machinery, cement, rubber, leather and the like; besides, the catalyst provided by the present invention is also suitable for preparing a polyurethane adhesive and can increase reaction speed in a gluing process, and the obtained polyurethane adhesive has favorable adhesive force, impact resistance, toughness and weatherability and has favorable bonding effect for porous materials such as foam plastics, woods, leather, fabrics, paper, ceramics and the like, as well as materials such as metal, glass, rubber, plastics and the like; and the catalyst provided by the present invention can also be used in a preparation technology of a polyurethane composite and can effectively improve the composite efficiency of PU and other materials, and the prepared composite has favorable tensile properties, impact resistance and corrosion resistance. Moreover, the catalyst provided by the present invention is also suitable for preparing ordinary polyurethane foam plastics, high-resilience polyurethane foam plastics, high-density polyurethane foam plastics, low-resilience polyurethane foam plastics and flexible polyurethane foam plastics added with a special component according to different needs, and the prepared flexible polyurethane foam plastics is light in weight and is capable of insulating heat, absorbing sound and resisting shock and corrosion, and therefore can be used as filter material, sound insulation material, shock-resistant material, decorative material, packaging material and thermal insulation and preservation material and further used for producing furniture, vehicle roofs, seat cushions, mattresses, pillows, clothing cases, shoes, package material, and the like. The catalyst provided by the present invention is also suitable for synthesizing rigid polyurethane material such as rigid polyurethane foam plastics, rigid polyurethane composites and polyurethane sole material, and the prepared rigid polyurethane material has the characteristics of sound insulation, shock resistance, electric insulation, heat resistance, cold resistance, solvent resistance and the like, can be further used as box body thermal insulation layers of refrigerators, freezers, refrigeration houses and refrigerator cars and thermal preservation material of buildings, storage tanks and pipelines and can also be used as a wood-like structure for producing furniture; and the polyurethane sole material can be used for producing leisure and fashion shoe soles, sports shoe insoles, safety shoe soles and the like. The sodium polyurethane catalyst also effectively reduces the yellowing degree of the synthesized polyurethane material, so that the polyurethane elastomer, the synthetic leather resin slurry, the coating, the adhesive and the polyurethane composite difficulty turn yellow, and the appearance of light-color polyurethane products is not affected.

(2) The polyurethane catalyst of the present invention further comprises a potassium compound, and the potassium compound, the sodium compound and the tertiary amine and/or pyridine compound have synergistic effects, so that the physical properties of the synthesized polyurethane material are further improved, and the polyurethane material is guaranteed to have high strength and favorable tear strength when the synthesis speed of the polyurethane material is increased.

(3) The polyurethane catalyst of the present invention does not contain heavy metal elements completely, and sodium and potassium compounds which largely exist in human bodies are used as main components of the polyurethane catalyst, so that the polyurethane catalyst is environmental-friendly, causes no environment pollution and no damage to the human body, and is free of volatile organic compound components, thereby being an environmental-friendly catalyst, and achieving catalytic effects of a non-environmental-friendly catalyst in the prior art while reducing harms of the catalyst. Moreover, the cost of the sodium compound is lower than that of other metal organic compounds used in the prior art, so that the production cost of the polyurethane catalyst is effectively reduced; and when the sodium compound is used, the use cost is also reduced because the addition quantity is lower than those of organic matters such as bismuth, and zinc.

(4) The polyurethane catalyst of the present invention is high in hydrolysis resistance and can effectively solve the problem in the prior art that catalysts can not be stored for a long time because organic compounds of tin, bismuth and zinc are prone to inactivation due to hydrolysis.

DETAILED DESCRIPTION

In order to make the purposes, technical schemes and advantages of the present invention more clearly, embodiments of the present invention will be further described in detail. In the following embodiment, wt % represents a percentage by weight; and an organic solvent is represented by formula (1):

wherein R is an alkyl group of $C_1$-20, a polyether group represented by formula (2), a nitrogen-containing group represented by formula (3), a nitrogen-containing group represented by formula (4), amide represented by formula (5) or amide represented by formula (6);

X and Y independently are H, OH, R or $R_1$:
n=1-100:
$R_1$ and $R_2$ independently are H or a linear, branched or cyclic, aliphatic or aromatic, saturated or unsaturated, unsubstituted or heteroatom-substituted hydrocarbon group having 1 to 10 carbon atoms; and $V_i$, $V_{i1}$ and $V_{i2}$ independently are H, OH or a polyether group represented by formula (2).

A stabilizer is a silicon surfactant or a non-silicon surfactant.

Embodiment 1

This embodiment provides a polyurethane catalyst which is prepared by dissolving 1 g of sodium butyrate, 70 g of pentamethyldiethylenetriamine and 0.5 g of isooctyl phosphate into 28.5 g of an organic solvent at room temperature for uniform mixing. In this embodiment, sodium butyrate accounts for 1 wt % of the polyurethane catalyst, and pentamethyldiethylenetriamine accounts for 70 wt % of the polyurethane catalyst.

In this embodiment, the organic solvent is n-pentane.

Embodiment 2

This embodiment provides a polyurethane catalyst which is prepared by dissolving 40 g of sodium neodecanoate, 20 g of sodium salicylate, 3.5 g of pentamethyldiethylenetriamine and 1.5 g of N,N-dimethyl-1,3-propanediamine into 35 g of an organic solvent at room temperature for uniform mixing. In this embodiment, sodium neodecanoate and sodium salicylate account for 60 wt % of the polyurethane catalyst, and pentamethyldiethylenetriamine and N,N-dimethyl-1,3-propanediamine account for 5 wt % of the polyurethane catalyst.

In this embodiment, the organic solvent is dimethyl ether.

Embodiment 3

This embodiment provides a polyurethane catalyst which is prepared by dissolving 1 g of sodium oleate, 5 g of 2-dimethylaminopyridine, 50 g of potassium benzoate and 20 g of polyoxyethylene isooctyl ether phosphate into 24 g of diethylamine at room temperature for uniform mixing. In this embodiment, sodium oleate accounts for 1 wt % of the polyurethane catalyst, 2-dimethylaminopyridine accounts for 5 wt % of the polyurethane catalyst, and potassium benzoate accounts for 50 wt % of the polyurethane catalyst.

In this embodiment, the organic solvent is dimethylamine.

Embodiment 4

This embodiment provides a polyurethane catalyst which is prepared by dissolving 5 g of sodium citrate, 5 g of sodium salicylate, 10 g of sodium neodecanoate, 10 g of triethylenediamine, 5 g of 1,3,5-tris(3-(dimethylamino)propyl)-1,3,5-hexahydrotriazine, 10.5 g of potassium laurate, 4.5 g of potassium oleate and 5 g of polydimethylsiloxane into 45 g of an organic solvent at room temperature for uniform mixing. In this embodiment, sodium citrate, sodium salicylate and sodium neodecanoate account for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In this embodiment, the organic solvent is triethylamine.

Embodiment 5

This embodiment provides a polyurethane catalyst which is prepared by dissolving 3.5 g of sodium citrate, 21.5 g of sodium hyaluronate, 3 g of 2-dimethylaminopyridine, 8 g of 1,8-diazabicyclo[5,4,0]undecenyl-7-ene, 2 g of 2,2-dimorpholinodiethylether, 2 g of pentamethyldiethylenetriamine, 12 g of potassium oleate, 3 g of potassium alginate and 5 g of silicone polyether into 40 g of an organic solvent at room temperature for uniform mixing. In this embodiment, sodium citrate and sodium hyaluronate account for 25% of the polyurethane catalyst, 2-dimethylaminopyridine, 1,8-diazabicyclo[5,4,0]undecenyl-7-ene, 2,2-dimorpholinodiethylether and pentamethyldiethylenetriamine account for 15% of the polyurethane catalyst, and potassium oleate and potassium alginate account for 15% of the polyurethane catalyst. In the organic solvent of this embodiment, R is an amide group represented by formula (5), $R_1$ is —$CH_2$—, $R_2$ is —$CH_2CH_3$—, $V_{i1}$ is H, and $V_{i2}$ is represented by formula (2), wherein n=20, and X and Y are H.

Embodiment 6

This embodiment provides a polyurethane catalyst which is prepared by dissolving 25 g of sodium salicylate, 5 g of sodium hydroxide, 11 g of (2-morpholinopyrid-4-yl) methanamine, 9 g of 2,4-diaminopyrimidine, 2 g of potassium cellulose, 8 g of potassium laurate and 3 g of polydimethylsiloxane into 37 g of an organic solvent at room temperature for uniform mixing. In this embodiment, sodium salicylate and sodium hydroxide account for 30 wt % of the polyurethane catalyst, (2-morpholinopyrid-4-yl)methanamine and 2,4-diaminopyrimidine account for 20 wt % of the polyurethane catalyst, and potassium cellulose and potassium laurate account for 10 wt % of the polyurethane catalyst.

In this embodiment, the organic solvent is acetic acid amide.

Embodiment 7

This embodiment provides a polyurethane catalyst which is prepared by dissolving 15 g of sodium benzoate, 18 g of sodium carbonate, 7 g of sodium bicarbonate, 1 g of pentamethylenetriamine, 1.5 g of 2,4-diaminopyrimidine, 2.5 g of 1,1'-[[3-(dimethylamino)propyl]imino]bis-2-propanol, 1 g of potassium hydroxide, 6 g of potassium bicarbonate and 3 g of polydimethylsiloxane into 45 g of an organic solvent at room temperature for uniform mixing. In this embodiment, sodium benzoate, sodium carbonate and sodium bicarbonate account for 40 wt % of the polyurethane catalyst, pentamethylenetriamine, 2,4-diaminopyrimidine and 1,1'-[[3-(dimethylamino)propyl]imino]bis-2-propanol account for 5 wt % of the polyurethane catalyst, and potassium hydroxide and potassium bicarbonate account for 7 wt % of the polyurethane catalyst.

In this embodiment, the organic solvent is $C_{15}H_{31}OH$.

Embodiment 8

This embodiment provides a polyurethane catalyst which is prepared by dissolving 12 g of sodium benzoate, 23 g of sodium formate, 2 g of tetramethyldipropylenetriamine, 3.5 g of 3-dimethylaminopropyl urea, 4.5 g of (dimethylaminoethyl)ether, 2 g of potassium carbonate, 8 g of potassium acetate and 3 g of trialkyl phosphite into 47 g of an organic solvent at room temperature for uniform mixing. In this embodiment, sodium benzoate and sodium formate account for 35 wt % of the polyurethane catalyst, tetramethyldipropylenetriamine, 3-dimethylaminopropyl urea and (dimethylaminoethyl) ether account for 1 wt % of the polyurethane catalyst, and potassium carbonate and potassium acetate account for 5 wt % of the polyurethane catalyst.

In the organic solvent of this embodiment, R is a polyether group represented by formula (2), wherein $R_1$ is $C_6H_5$—, $R_2$ is —CH=CH—, n=25, and X and Y are H.

Embodiment 9

This embodiment provides a polyurethane catalyst which is prepared by dissolving 16 g of sodium formate, 24 g of sodium acetate, 10 g of sodium propionate, 1 g of 1-(methylamino)-3-(4-methylpiperazine-1-yl)-2-propanol, 9 g of N,N-bi[3-(dimethylamino)propyl]-N',N'-dimethyl-1,3-propanediamine, 1 g of potassium propionate, 1 g of potassium valerate and 1 g of alkyl ether phosphate into 37 g of an organic solvent at room temperature for uniform mixing. In this embodiment, sodium formate, sodium acetate and sodium propionate account for 50 wt % of the polyurethane catalyst, 1-(methylamino)-3-(4-methylpiperazine-1-yl)-2-propanol and N,N-bi[3-(dimethylamino)propyl]-N',N'-dimethyl-1,3-propanediamine account for 10 wt % of the polyurethane catalyst, and potassium propionate and potassium valerate account for 2% of the polyurethane catalyst.

In this embodiment, the organic solvent is $(CH_3)_2CHNHCH_2CH_2CH_3$.

Embodiment 10

This embodiment provides a polyurethane catalyst which is prepared by dissolving 1 g of sodium valerate, 1.3 g of sodium caprylate, 2.7 g of sodium caprate, 30 g of 2-[[3-(dimethylamino)propyl]methylamino]ethanol, 22 g of N,N-dimenthylethanolamine, 8 g of N,N-dimethyl benzylamine, 1.4 g of potassium caproate, 2.7 g of potassium caprylate, 0.9 g of potassium caprate and 2 g of silicone polyether into 28 g of an organic solvent at room temperature for uniform mixing. In this embodiment, sodium valerate, sodium caprylate and sodium caprate account for 5 wt % of the polyurethane catalyst, 2-[[3-(dimethylamino)propyl]methylamino]ethanol, N,N-dimenthylethanolamine and N,N-dimethyl benzylamine account for 60 wt % of the polyurethane catalyst, and potassium caproate, potassium caprylate and potassium caprate account for 5 wt % of the polyurethane catalyst.

In the organic solvent of this embodiment, R is a nitrogen-containing group represented by formula (4), wherein $R_1$ is benzyl, $R_2$ is isopropyl, $V_{i1}$ and $V_{i2}$ are H, X is H, and Y is OH.

Embodiment 11

This embodiment provides a polyurethane catalyst which is prepared by dissolving 8 g of sodium 2-ethylhexanoate, 17 g of sodium laurate, 10 g of sodium maleate, 12 g of cetylamine, 2 g of tetramethylguanidine, 1 g of 4-methylmorpholine-2-methylamine, 4.5 g of potassium 2-ethylhexanoate, 0.5 g of potassium neodecanoate and 3 g of polydimethylsiloxane into 42 g of an organic solvent at room temperature for uniform mixing. In this embodiment, sodium 2-ethylhexanoate, sodium laurate and sodium maleate account for 35 wt % of the polyurethane catalyst, cetylamine, tetramethylguanidine and 4-methylmorpholine-2-methylamine account for 15 wt % of the polyurethane catalyst, and potassium 2-ethylhexanoate and potassium neodecanoate account fort 5 wt % of the polyurethane catalyst.

In the organic solvent of this embodiment, R is an amide group represented by formula (5), wherein $R_1$ is —$CH_2CHCH_2CCl$—, $R_2$ is cyclohexyl, $V_{i1}$ is H, $V_{i2}$ is represented by formula (2), n=15, X is H, and Y is OH.

Embodiment 12

This embodiment provides a polyurethane catalyst which is prepared by dissolving 12.5 g of sodium oxalate, 7.5 g of sodium methoxide, 11 g of 1-isobutyl-2-methylimidazole, 7 g of 2-amino-α-[[2-(1,1-dimethylethoxy)-2-oxoethoxy]imino]-4-thiazoleacetic acid, 2 g of O,O-diethyl thiophosphate anhydride, 9 g of potassium salicylate, 11 g of potassium oxalate and 3 g of polydimethylsiloxane into 37 g of an organic solvent at room temperature for uniform mixing. In this embodiment, sodium oxalate and sodium methoxide account for 20 wt % of the polyurethane catalyst, 1-isobutyl-2-methylimidazole, 2-amino-α-[[2-(1,1-dimethylethoxy)-2-oxoethoxy]imino]-4-thiazoleacetic acid and O,O-diethyl thiophosphate anhydride account for 20 wt % of the polyurethane catalyst, and potassium salicylate and potassium oxalate account for 20 wt % of the polyurethane catalyst.

In the organic solvent of this embodiment, R is an amide group represented by formula (6), wherein $R_1$ is heptyl, $R_2$ is cinnamenyl, $V_{i1}$ is H, X is $R_1$, and Y is OH.

Embodiment 13

This embodiment provides a polyurethane catalyst which is prepared by dissolving 5 g of sodium cellulose, 2 g of sodium carboxymethylcellulose, 2 g of N-ethyl morpholine, 4 g of N,N'-diisopropylcarbodiimide, 9 g of 2,4-bis(dimethylamino)pyrimidine-6-carboxylic acid, 18 g of potassium methoxide, 22 g of potassium carboxymethylcellulose and 2 g of polydimethylsiloxane into 36 g of an organic solvent at room temperature for uniform mixing. In this embodiment, sodium cellulose and sodium carboxymethylcellulose account for 7 wt % of the polyurethane catalyst, N-ethyl morpholine, N,N'-diisopropylcarbodiimide and 2,4-bis(dimethylamino)pyrimidine-6-carboxylic acid account for 15 wt % of the polyurethane catalyst, and potassium methoxide and potassium carboxymethylcellulose account for 40 wt % of the polyurethane catalyst.

In the organic solvent of this embodiment, R is an amide group represented by formula (6), wherein $R_1$ is 2,2-dimethylthexyl, $R_2$ is isobutyl, $V_{i1}$ is —OH, X is H, and Y is R.

Embodiment 14

This embodiment provides a polyurethane catalyst which is prepared by dissolving 25 g of sodium gluconate, 12 g of 1-(methylamino)-3-(4-methylpiperazine-1-yl)-2-propanol, 9 g of 2,2,4-trimethyl-1-oxa-4-aza-2-silacyclohexane, 9 g of 1-(3-dimethylamino-propyl)-piperazine, 2 g of potassium hyaluronate, 6 g of potassium gluconate and 2 g of trialkyl phosphite into 35 g of an organic solvent at room temperature for uniform mixing. In this embodiment, sodium gluconate accounts for 25 wt % of the polyurethane catalyst, 1-(methylamino)-3-(4-methylpiperazine-1-yl)-2-propanol, 2,2,4-trimethyl-1-oxa-4-aza-2-silacyclohexane and 1-(3-dimethylamino-propyl)-piperazine account for 30 wt % of the polyurethane catalyst, and potassium hyaluronate and potassium gluconate account for 8 wt % of the polyurethane catalyst.

In the organic solvent of this embodiment, R is a polyether group represented by formula (2), wherein $R_1$ is cyclohexyl, $R_2$ is n-pentyl, n=40, X is H and Y is $R_1$.

Embodiment 15

This embodiment provides a polyurethane catalyst which is prepared by dissolving 35 g of sodium butyrate, 20 g of N,N-dimethyl-1-(morpholin-2-yl) methanamine, 5 g of N,N-dimethyl(4-methyl-1-piperazinyl) ethanamine, 7 g of hexahydro-1,3,5-trimethyl-S-triazin, 2 g of potassium benzoate and 1 g of polyoxyethylene isooctyl ether phosphate into 27 g of an organic solvent at room temperature for uniform mixing. In this embodiment, sodium butyrate accounts for 35 wt % of the polyurethane catalyst, N,N-dimethyl-1-(morpholin-2-yl) methanamine, N,N-dimethyl (4-methyl-1-piperazinyl)ethanamine and hexahydro-1,3,5-trimethyl-S-triazin account for 35 wt % of the polyurethane catalyst, and potassium benzoate accounts for 2 wt % of the polyurethane catalyst.

In the organic solvent of this embodiment, R is a polyether group represented by formula (2), wherein $R_1$ is cyclohexyl, $R_2$ is n-pentyl, n=28, X is H and Y is H.

Embodiment 16

This embodiment provides a polyurethane catalyst which is prepared by dissolving 55 g of sodium salicylate, 1.5 g of N,N'-carbonyldiimidazole, 3 g of dicyclohexylcarbodiimide 5.5 g of o-(7-azabenzotriazol-1-yl)-N,N,N',N'-te-tramethyl-uroniumhexafluorophosphate and 3 g of polyoxyethylene isooctyl ether phosphate into 32 g of an organic solvent at room temperature for uniform mixing. In this embodiment, sodium salicylate accounts for 55 wt % of the polyurethane catalyst, N,N'-carbonyldiimidazole, dicyclohexylcarbodiimide and o-(7-azabenzotriazol-1-yl)-N,N,N',N'-te-tramethyl-uroniumhexafluorophosphate account for 10 wt % of the polyurethane catalyst.

In the organic solvent of this embodiment, R is a nitrogen-containing group represented by formula (4), $R_1$ is pyridyl, $R_2$ is —$CH_2CH_2$—, X is H, and Y is $R_1$.

Embodiment 17

This embodiment provides a polyurethane catalyst which is prepared by dissolving 35 g of sodium oxalate, 2 g of N-hydroxy-7-azabenzotriazole, 5 g of bromo-tris-pyrrolidino-phosphoniumhexafluorophosphate, 13 g of O-(benzo-triazol-1-yl)-N,N,N',N'-tetramethyluroniumtetrafluorobo-rate, 5 g of potassium oleate and 3 g of polydimethylsiloxane into 37 g of an organic solvent at room temperature for uniform mixing. In this embodiment, sodium oxalate accounts for 35 wt % of the polyurethane catalyst, N-hydroxy-7-azabenzotriazole, bromo-tris-pyrrolidino-phospho-niumhexafluorophosphate and O-(benzotriazol-1-yl)-N,N, N',N'-tetramethyluroniumtetrafluoroborate account for 20 wt % of the polyurethane catalyst, and potassium oleate accounts for 5 wt % of the polyurethane catalyst.

In the organic solvent of this embodiment, R is an amide group represented by formula (6), wherein $R_1$ is n-pentyl, $R_2$ is —$CH_2CH_2$—, $V_{i1}$ is OH, X is H, and Y is $R_1$.

Embodiment 18

This embodiment provides a polyurethane catalyst which is prepared by dissolving 5 g of sodium citrate, 5 g of sodium salicylate, 10 g of sodium neodecanoate, 10 g of triethyl-enediamine, 5 g of 1,3,5-tris(3-(dimethylamino)propyl)-1,3, 5-hexahydrotriazine, 10.5 g of potassium laurate, and 4.5 g of potassium oleate into 50 g of an organic solvent at room temperature for uniform mixing. In this embodiment, sodium citrate, sodium salicylate and sodium neodecanoate account for 20 wt % of the polyurethane catalyst, triethyl-enediamine and 1,3,5-tris(3-(dimethylamino)propyl)-1,3,5-hexahydrotriazine account for 15 wt % of the polyurethane catalyst, and the potassium laurate and the potassium oleate account for 15 wt % of the polyurethane catalyst.

In this embodiment, the organic solvent is triethylamine.

Embodiment 19

The embodiment provides a polyurethane catalyst which is prepared by dissolving 40 g of sodium neodecanoate, 20 g of sodium salicylate, 2.5 g of pentamethyldiethylenetri-amine, 1.5 g of N,N-dimethyl-1,3-propanediamine and 1 g of a stabilizer into 35 g of an organic solvent at room temperature for uniform mixing. In this embodiment, sodium neodecanoate and sodium salicylate account for 60 wt % of the polyurethane catalyst, and pentamethyldiethyl-enetriamine and N,N-dimethyl-1,3-propanediamine account for 5 wt % of the polyurethane catalyst.

In this embodiment, the organic solvent is dimethyl ether.

Embodiment 20

This embodiment provides a polyurethane catalyst which is prepared by dissolving 35 g of sodium butyrate, 20 g of N,N-dimethyl-1-(morpholin-2-yl) methanamine, 8 g of N,N-dimethyl(4-methyl-1-piperazinyl) ethanamine, 7 g of hexahydro-1,3,5-trimethyl-S-triazin, 28 g of potassium benzoate and 1 g of polyoxyethylene isooctyl ether phosphate into 27 g of an organic solvent at room temperature for uniform mixing. In this embodiment, sodium butyrate accounts for 35 wt % of the polyurethane catalyst, N,N-dimethyl-1-(morpholin-2-yl) methanamine, N,N-dimethyl (4-methyl-1-piperazinyl)ethanamine and hexahydro-1,3,5-trimethyl-S-triazin account for 35 wt % of the polyurethane catalyst, and potassium benzoate accounts for 2 wt % of the polyurethane catalyst.

In the organic solvent of this embodiment, R is a polyether group represented by formula (2), wherein $R_1$ is cyclohexyl, $R_2$ is n-pentyl, n=40, X is H, and Y is $R_1$.

Embodiment 21

This embodiment provides a polyurethane catalyst which is prepared by dissolving 40 g of sodium neodecanoate, 20 g of sodium salicylate, 3.5 g of pentamethyldiethylenetri-amine and 1.5 g of N,N-dimethyl-1,3-propanediamine into 35 g of an organic solvent at room temperature for uniform mixing. In this embodiment, sodium neodecanoate and sodium salicylate account for 60 wt % of the polyurethane catalyst, and pentamethyldiethylenetriamine and N,N-dim-ethyl-1,3-propanediamine account for 5 wt % of the polyurethane catalyst.

In this embodiment, the organic solvent is dimethyl ether.

Comparative Example 1

This comparative example provides a polyurethane catalyst which is prepared by dissolving 20 g of dibutyltin dilaurate, 14 g of triethylenediamine, 1 g of 1,3,5-tris(3-(dimethylamino)propyl)-1,3,5-hexahydrotriazine, 12 g of potassium laurate, 3 g of potassium oleate and 2 g of polydimethylsiloxane into 48 g of an organic solvent at room temperature for uniform mixing. In this embodiment, dibutyltin dilaurate accounts for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In this embodiment, the organic solvent is triethylamine.

Comparative Example 2

The comparative example provides a polyurethane catalyst which is prepared by dissolving 20 g of zinc caproate, 14 g of triethylenediamine, 1 g of 1,3,5-tris(3-(dimethylamino)propyl)-1,3,5-hexahydrotriazine, 12 g of potassium laurate, 3 g of potassium oleate and 2 g of polydimethylsiloxane into 48 g of an organic solvent at room temperature for uniform mixing. In this embodiment, zinc caproate accounts for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In this embodiment, the organic solvent is triethylamine.

Comparative Example 3

The comparative example provides a polyurethane catalyst which is prepared by dissolving 20 g of bismuth neodecanoate, 14.5 g of triethylenediamine, 0.5 g of 1,3,5-tris(3-(dimethylamino)propyl)-1,3,5-hexahydrotriazine, 8 g of potassium laurate, 7 g of potassium oleate and 1 g of polydimethylsiloxane into 49 g of an organic solvent at room temperature for uniform mixing. In this embodiment, bismuth neodecanoate accounts for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In this embodiment, the organic solvent is triethylamine.

Comparative Example 4

This comparative example provides a polyurethane catalyst which is prepared by dissolving 20 g of dibutyltin dilaurate, 14 g of triethylenediamine, 1 g of 1,3,5-tris(3-(dimethylamino)propyl)-1,3,5-hexahydrotriazine, 12 g of potassium laurate, 3 g of potassium oleate and 2 g of polydimethylsiloxane into 48 g of an organic solvent at room temperature for uniform mixing. In this embodiment, dibutyltin dilaurate accounts for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In the organic solvent of this embodiment, R is a nitrogen-containing group represented by formula (4), wherein $R_1$ is —$CH_2$—, $R_2$ is —$CH_2$—, $V_{i1}$ and $V_{i2}$ are H, and X and Y are H.

Comparative Example 5

The comparative example provides a polyurethane catalyst which is prepared by dissolving 20 g of zinc caproate, 14 g of triethylenediamine, 1 g of 1,3,5-tris(3-(dimethylamino)propyl)-1,3,5-hexahydrotriazine, 12 g of potassium laurate, 3 g of potassium oleate and 2 g of polydimethylsiloxane into 48 g of an organic solvent at room temperature for uniform mixing. In this embodiment, zinc caproate accounts for 20 wt % of the polyurethane catalyst, triethylenediamine and 1,3,5-tris(3-(dimethylamino)propyl)-1,3,5-hexahydrotriazine account for 15 wt % of the polyurethane catalyst, and potassium laurate and potassium oleate account for 15 wt % of the polyurethane catalyst.

In the organic solvent of this embodiment, R is a nitrogen-containing group represented by formula (4), wherein $R_1$ is —$CH_2$—, $R_2$ is —$CH_2$—, $V_{i1}$ and $V_{i2}$ are H, and X and Y are H.

Comparative Example 6

The comparative example provides a polyurethane catalyst which is prepared by dissolving 20 g of bismuth neodecanoate, 14.5 g of triethylenediamine, 0.5 g of 1,3,5-tris(3-(dimethylamino)propyl)-1,3,5-hexahydrotriazine, 8 g of potassium laurate, 7 g of potassium oleate and 1 g of polydimethylsiloxane into 49 g of an organic solvent at room temperature for uniform mixing. In the embodiment, the bismuth neodecanoate accounts for 20 wt % of the polyurethane catalyst, the triethylenediamine and the 1,3,5-tris(3-(dimethylamino)propyl)-1,3,5-hexahydrotriazine account for 15 wt % of the polyurethane catalyst, and the potassium laurate and the potassium oleate account for 15 wt % of the polyurethane catalyst.

In the organic solvent of the embodiment, R is a nitrogen-containing group in a formula (4), wherein $R_1$ is —$CH_2$—, $R_2$ is —$CH_2$—, $V_{i1}$ and $V_{i2}$ are H, X and Y are H.

Test Case 1

(1) The polyurethane catalysts provided by the embodiments 4-6 and the comparative examples 1-3 are used to prepare polyurethane synthetic leather resin slurry:

0.1 g of each polyurethane catalyst of the embodiments 4-6 and the comparative examples 1-3 is uniformly mixed with 150 g of polyester polyol and 20 g of diethylene glycol in a stirred tank, then 30 g of 4,4'-diphenylmethane diisocyanate is added to obtain a mixture, and the mixture is stirred at a temperature of 60 DEG C. with a stirring speed of 300 pm/min until the reaction is completed to obtain the polyurethane synthetic leather resin slurry.

When the catalysts provided by the embodiments 4-6 are used to prepare the polyurethane synthetic leather resin slurry, reaction time for preparing the polyurethane synthetic leather resin slurry is 120 min; and when the catalysts provided by the comparative examples 1-3 are used to prepare the polyurethane synthetic leather resin slurry, if reaction time for polymerization is 120 min, products are mainly mixtures of polyester polyol, diethylene glycol, isocyanate and the polyurethane catalyst while polyurethane synthetic leather resin slurry meeting industrial requirements is not formed, and the polyurethane synthetic leather resin slurry meeting the industrial requirements can be prepared only by prolonging the reaction time to 180 min, 300 min and 280 min respectively.

Physical and mechanical properties of polyurethane synthetic leather resin slurry samples prepared by using the polyurethane catalysts provided by the embodiments 4-6 and the comparative examples 1-3 are tested:

tensile strength, elongation at break and fracture strength of each sample are tested according to the National Light Industry Standard QBT2710-2005; and texture forming properties of each sample are tested: each test sample is applied to coat a glass plate groove with a certain depth, and after drying, a ratio of the thickness of a formed film to the depth of the glass plate groove is a texture forming property value of the sample. Results are shown in Table 1:

TABLE 1

|  | Elongation At Break (%) | 100% Modulus (Mpa) | 300% Modulus (Mpa) | Fracture Strength (Mpa) | Texture Forming Property (%) |
|---|---|---|---|---|---|
| Embodiment 4 | 325 | 36.92 | 95.68 | 145.1 | 52.53 |
| Embodiment 5 | 315 | 35.72 | 128.5 | 201.8 | 52.98 |
| Embodiment 6 | 350 | 36.5 | 110 | 235.7 | 54.45 |
| Comparative example 1 | 315 | 32.8 | 108.5 | 145.5 | 51.23 |
| Comparative example 2 | 312 | 32.6 | 90 | 157.7 | 50.4 |
| Comparative example 3 | 300 | 33.5 | 92.3 | 112.5 | 50.75 |

The above results show that, compared with the polyurethane catalysts provided by the comparative examples 1-3, the polyurethane catalysts provided by the embodiments 4-6 have higher catalytic activity and allow polymerization of isocyanate and polyether polyol to be completed faster under the same reaction conditions; and in addition, the synthetic leather resin slurry prepared by using the polyurethane catalysts provided by the embodiments 4-6 has more favorable physical properties while catalytic activity is guaranteed: elongation at break is larger, tensile strength and fracture strength are higher when elongation at break is 100% and 300%, a good texture forming property is also kept, and the synthetic leather resin slurry can be used as a finishing agent and used for manufacturing artificial leather, suede-like fabrics, synthetic leather, electrostatic flocking, superfine fibers, and the like.

(2) Polyurethane adhesives are prepared by using the polyurethane catalysts provided by the embodiments 4-6 and the comparative examples 1-3, and the polyurethane adhesives can be single-component adhesives only comprising polyurethane and can also be multicomponent adhesives comprising polyurethane and other additives.

In this test case, a single-component polyurethane adhesive is taken as an example: 0.1 g of each catalyst of the embodiments 4-6 and the comparative examples 1-3 is uniformly mixed with 300 g of polyether polyol with a functionality of 2 and a molecule weights of 8000, 5 g of diethanolamine, 5 g of ethylenediamine and 16 g of dichloromethane in a stirred tank, then 200 g of polymethylene polyphenyl isocyanate is added to obtain a mixture, and the mixture is stirred at a temperature of 80 DEG C. with a stirring speed of 200 rpm/min until the reaction is completed to obtain the polyurethane adhesive.

When the catalysts provided by the embodiments 4-6 are used to prepare the polyurethane adhesives, reaction time for preparing the polyurethane adhesives is 120 min; and when the catalysts provided by the comparative examples 1-3 are used to prepare the polyurethane adhesives, if reaction time for polymerization is 120 min, products are mainly mixtures of polyether polyol, diethanolamine, ethylenediamine, dichloromethane, polymethylene polyphenyl isocyanate and the polyurethane catalyst while the polyurethane adhesives meeting industrial requirements are not formed, and the polyurethane adhesives can be prepared only by prolonging the reaction time to 160 min, 180 min and 200 min respectively.

Physical and mechanical properties of polyurethane adhesive samples prepared by using the polyurethane catalysts provided by the embodiments 4-6 and the comparative examples 1-3 are tested:

elongation at break of each sample is tested according to the National Standard GB/T6344-86, shear strength of each sample is tested according to the National Standard GB/T7124-1986, compressive strength and elastic modulus of each sample are tested according to the National Standard GB/T12954-1991, shrinkage rate of each sample is tested according to the Standard of Ministry of Chemical Industry HG/T2380-1992; after the samples are subjected to ageing for a period of 200 h at a temperature of 90 DEG C., yellowness of each sample is tested according to the Standard of Ministry of Chemical Industry HG/T3862, the thermal ageing resistance of each sample is tested according to the National Standard GB/T16998-1997, and the weatherability of each sample is tested according to the National Standard GB24264-2009. Results are shown in Table 2:

TABLE 2

|  | Compressive strength (MPa) | Elastic modulus (MPa) | Shear strength (MPa) | Shrinkage rate (%) | Elongation at break (%) | Weatherability | Thermal ageing resistance |
|---|---|---|---|---|---|---|---|
| Embodiment 4 | 45 | 390 | 7.4 | 1.5 | 140 | Elastic modulus is increased by 9%, and no abnormality exists on appearance | Elastic modulus is increased by 16%, and no abnormality exists on appearance |
| Embodiment 5 | 40 | 400 | 7.6 | 2 | 135 | Elastic modulus is increased by 12%, and no abnormality exists on appearance | Elastic modulus is increased by 19%, and no abnormality exists on appearance |

TABLE 2-continued

| | Compressive strength (MPa) | Elastic modulus (MPa) | Shear strength (MPa) | Shrinkage rate (%) | Elongation at break (%) | Weatherability | Thermal ageing resistance |
|---|---|---|---|---|---|---|---|
| Embodiment 6 | 55 | 390 | 7.8 | 2.3 | 150 | Elastic modulus is increased by 13%, and no abnormality exists on appearance | Elastic modulus is increased by 18%, and no abnormality exists on appearance |
| Comparative example 1 | 40 | 380 | 7.3 | 2.5 | 125 | Elastic modulus is increased by 11%, and no abnormality exists on appearance | Elastic modulus is increased by 19%, and no abnormality exists on appearance |
| Comparative example 2 | 38 | 370 | 7.2 | 3 | 130 | Elastic modulus is increased by 14%, and no abnormality exists on appearance | Elastic modulus is increased by 20%, and no abnormality exists on appearance |
| Comparative example 3 | 42 | 340 | 7.5 | 2.4 | 125 | Elastic modulus is increased by 14%, and no abnormality exists on appearance | Elastic modulus is increased by 20%, and no abnormality exists on appearance |

The results show that, compared with the polyurethane catalysts provided by the comparative examples 1-3, the polyurethane catalysts provided by the embodiments 4-6 has higher catalytic activity and allow polymerization of polymethylene polyphenyl isocyanate and polyether polyol to be completed faster under the same reaction conditions; and in addition, the polyurethane adhesives prepared by using the polyurethane catalysts provided by the embodiments 4-6 have more favorable physical properties while catalytic activity is guaranteed: compressive strength, elastic modulus and shear strength are all kept at a higher level, shrinkage rate is smaller, elongation at break is higher, weatherability is good as deformation of the adhesives is smaller and no abnormality exists on appearance after ageing for a period of 200 h at a temperature of 90 DEG C., and the adhesives have favorable adhesion effects on porous materials including foam plastics, woods, leather, fabrics, paper, ceramics and the like as well as materials with smooth surfaces such as metal, glass, rubber and plastics.

(3) Polyurethane coatings are prepared by using the polyurethane catalysts provided by the embodiments 4-6 and the comparative examples 1-3, and the polyurethane adhesives can be single-component coatings comprising polyurethane only and can also be multicomponent coatings comprising polyurethane and other additives.

In this test case, a single-component polyurethane coating is taken as an example: 0.1 g of each catalyst of the embodiments 4-6 and the comparative examples 1-3 is uniformly mixed with 210 g of polyether polyol with a functionality of 2 and a molecule weight of 8000 in a stirred tank, then 80 g of isophorone diisocyanate (IPDI) is added, a constant temperature reaction is performed at a temperature of 80 DEG C. for a period of 2-4 h, an end point of the reaction is determined by using a butyl alcohol method, then cooling is performed to reduce the temperature to 50 DEG C., dimethylol propionic acid (DMPA) and 1,4-butanediol (BDO) which are dissolved with N-methyl pyrrolidone, are added for a reaction for 1-3 hours, then triethylamine is added for a reaction for 30 minutes, a certain amount of water is added under violent stirring, and finally, a solvent is removed under a condition of vacuum distillation to obtain a waterborne polyurethane coating.

When the catalysts provided by the embodiments 4-6 are used to prepare the polyurethane coatings, reaction time for preparing the polyurethane coatings is 120 min; and when the catalysts provided by the comparative examples 1-3 are used to prepare the polyurethane coatings, if reaction time of polymerization is 120 min, products are mainly mixtures of polyether polyol, IPDI and the polyurethane catalysts while polyurethane coatings meeting industrial requirements are not formed, and the polyurethane coatings meeting industrial requirements can be prepared only by prolonging the reaction times to 150 min, 150 min and 180 min respectively.

Physical and mechanical properties of polyurethane coating samples prepared by using the polyurethane catalysts provided by the embodiments 4-6 and the comparative examples 1-3 are tested:

tensile strength, elongation at break and elastic modulus of each sample are tested according to the National Standard GB/T23999-2009, and after the samples are subjected to ageing at a temperature of 90 DEG C. for 200 h, yellowness index of each sample is tested according to HG/T3862, and ageing resistance and weatherability of each sample are tested according to National Standard GB/T23999-2009. Results are shown in Table 3:

TABLE 3

| | Tensile strength (MPa) | Elastic modulus (MPa) | Elongation at break (%) | Weatherability | Thermal ageing resistance |
|---|---|---|---|---|---|
| Embodiment 4 | 5.2 | 200 | 150 | Variation of the tensile strength is smaller than 8%, and no abnormality exists on appearance | Variation of the tensile strength is smaller than 5%, and no abnormality exists on appearance |
| Embodiment 5 | 5.5 | 220 | 161 | Variation of the tensile strength is smaller than 7%, and no abnormality exists on appearance | Variation of the tensile strength is smaller than 3%, and no abnormality exists on appearance |
| Embodiment 6 | 5 | 240 | 165 | Variation of the tensile strength is smaller than 7%, and no abnormality exists on appearance | Variation of the tensile strength is smaller than 8%, and no abnormality exists on appearance |
| Comparative example 1 | 5.1 | 194 | 149 | Variation of the tensile strength is smaller than 8%, and no abnormality exists on appearance | Variation of the tensile strength is smaller than 6%, and no abnormality exists on appearance |
| Comparative example 2 | 4.6 | 176 | 140 | Variation of the tensile strength is smaller than 8%, and no abnormality exists on appearance | Variation of the tensile strength is smaller than 11%, and no abnormality exists on appearance |
| Comparative example 3 | 4.7 | 178 | 145 | Variation of the tensile strength is smaller than 6%, and no abnormality exists on appearance | Variation of the tensile strength is smaller than 5%, and no abnormality exists on appearance |

The above results show that, compared with the polyurethane catalysts provided by the comparative examples 1-3, the polyurethane catalysts provided by the embodiments 4-6 have higher catalytic activity and allow polymerization of isophorone diisocyanate (IPDI) and polyether polyol to be completed faster under the same reaction conditions; and in addition, the polyurethane coatings prepared by using the polyurethane catalysts provided by the embodiments 4-6 have more favorable physical properties while the catalytic activity is guaranteed: tensile strength, elastic modulus and elongation at break are higher, the weatherability is better as deformation of the coatings is smaller and no abnormality exists on appearance after ageing at the temperature of 90 DEG C. for 200 h, and the polyurethane coatings can be used for finishing materials such as high-grade woodenware, large engineering machinery, cement, rubber, leather and the like.

(4) Polyurethane elastomers (prepolymers) are prepared by using the polyurethane catalysts provided by the embodiments 4-6 and the comparative examples 1-3:

0.15 g of each polyurethane catalyst of the embodiments 4-6 and the comparative examples 1-3 is uniformly mixed with 100 g of polytetramethylene ether glycol (PTMEG) (Mn=1000) and a polyether (Mn=5000) with a functionality of 3 in a stirred tank, then 25 g of 4,4'-diphenylmethane diisocyanate (MDI) is added to obtain a mixture, and the mixture is stirred at a temperature of 80 DEG C. with a stirring speed of 200 rpm/min until the reaction is completed to obtain the polyurethane elastomer (prepolymer).

When the catalysts provided by the embodiments are used to prepare the polyurethane elastomers (prepolymers), reaction time for preparing the elastomers (prepolymers) is 120 min; and when the catalysts provided by the comparative examples 1-3 are used to prepare the polyurethane elastomers (prepolymers), if reaction time of polymerization is 120 min, products are mainly mixtures of polytetramethylene ether glycol (PTMEG), the three-functionality polyether, 4,4'-diphenylmethane diisocyanate (MDI) and the polyurethane catalysts while the polyurethane elastomers (prepolymers) meeting industrial requirements are not formed, and the polyurethane elastomers (prepolymers) meeting industrial requirements can be prepared only by prolonging the reaction times to 140 min, 150 min and 180 min respectively.

Physical and mechanical properties of polyurethane coating samples prepared by using the polyurethane catalysts provided by the embodiments 4-6 and the comparative examples 1-3 are tested:

tensile strength, elongation at break and elastic modulus of each sample are tested according to the National Standard GB/T528-1998, density of each sample is tested according to the National Standard GB50404-2007, hardness (ShoreD) of each sample is tested according to the National Standard GB/T531-92, and ageing resistance and weatherability of each sample are tested according to the National Standard GB/T18244-2000 after the samples are subjected to ageing at a temperature of 90 DEG C. for 200 h. Results are shown in Table 4:

TABLE 4

| | Density (g/cm3) | ShoreD | Tensile strength (MPa) | Elastic modulus (MPa) | Elongation at break (%) | Weatherability | Thermal ageing resistance |
|---|---|---|---|---|---|---|---|
| Embodiment 4 | 0.68 | 41 | 11.1 | 85 | 88 | Variation of the tensile strength is smaller than 5%, and no abnormality exists on appearance | Variation of the tensile strength is smaller than 6%, and no abnormality exists on appearance |
| Embodiment 5 | 0.66 | 34 | 12.4 | 77 | 74 | Variation of the tensile strength is smaller than 3%, and no abnormality exists on appearance | Variation of the tensile strength is smaller than 3%, and no abnormality exists on appearance |
| Embodiment 6 | 0.55 | 37 | 11.2 | 74 | 64 | Variation of the tensile strength is smaller than 4%, and no abnormality exists on appearance | Variation of the tensile strength is smaller than 6%, and no abnormality exists on appearance |
| Comparative example 1 | 0.63 | 48 | 7.7 | 63 | 70 | Variation of the tensile strength is smaller than 4%, and no abnormality exists on appearance | Variation of the tensile strength is smaller than 5%, and no abnormality exists on appearance |
| Comparative example 2 | 0.73 | 53 | 11 | 61 | 45 | Variation of the tensile strength is smaller than 3%, and no abnormality exists on appearance | Variation of the tensile strength is smaller than 3%, and no abnormality exists on appearance |
| Comparative example 3 | 0.76 | 60 | 10 | 60 | 67 | Variation of the tensile strength is smaller than 2%, and no abnormality exists on appearance | Variation of the tensile strength is smaller than 6%, and no abnormality exists on appearance |

The above results show that, compared with the polyurethane catalysts provided by the comparative examples 1-3, the polyurethane catalysts provided by the embodiments 4-6 have higher catalytic activity and allow polymerization of 4,4'-diphenylmethane diisocyanate (MDI), polytetramethylene ether glycol and the three functionality polyether to be completed faster under the same reaction conditions; and in addition, the polyurethane coatings prepared by using the polyurethane catalysts provided by the embodiments 4-6 have more favorable physical properties while the catalytic activity is guaranteed: density and hardness are smaller while tensile strength, elastic modulus and elongation at break are higher, and the weatherability of the elastomers (prepolymers) is good as deformation is smaller and no abnormality exists on appearance after ageing at a temperature of 90 DEG C. for 200 h.

(5) Polyurethane composites are prepared by using the polyurethane catalysts provided by the embodiments 4-6 and the comparative examples 1-3:

0.2 g of each polyurethane catalyst of the embodiments 4-6 and the comparative examples 1-3 is uniformly mixed with 200 g of a polyether polyol with a functionality of 3 and a molecule weight of 5000 in a stirred tank, then ground glass fibers are added, then toluene diisocyanate is added to obtain a mixture, the mixture is stirred at a temperature of 80 DEG C. with a stirring speed of 500 rpm/min until the reaction is completed to obtained a reacted material, and finally the reacted material is put into a mold with a temperature of 100 DEG C. and subjected to solidification at a temperature of 130 DEG C. for 4 h obtain the glass fiber polyurethane composite.

When the catalysts provided by the embodiments 4-6 are used to prepare the glass fiber polyurethane composites, reaction time for preparing the composites is 120 min; and when the catalysts provided by the comparative examples 1-3 are used to prepare the glass fiber polyurethane composites, if reaction time is 120 min, products are mainly mixtures of polyether polyol, glass fibers, toluene diisocyanate and the polyurethane catalysts while polyurethane composites meeting industrial requirements are not formed, and the polyurethane composites meeting industrial requirements can be prepared only by prolonging the reaction times to 150 min, 180 min and 200 min respectively.

Physical and mechanical properties of glass fiber polyurethane composite samples prepared by using the polyurethane catalysts provided by the embodiments 4-6 and the comparative examples 1-3 are tested:

tensile force, elongation at break and tensile strength of each sample are tested according to the National Standard GB/T528-1998, tear strength of each sample is tested according to the National Standard GB/T529-1999, and ageing resistance and the weatherability of each sample are tested according to the National Standard GB/T18244-2000 after the samples are subjected to aging at a temperature of 90 DEG C. for 200 h. Results are shown in Table 5:

TABLE 5

| | Tensile force (N) | Shore A | Tensile strength (MPa) | Tear strength (MPa) | Elongation at break (%) | Elastic modulus (MPa) | Weatherability | Thermal ageing resistance |
|---|---|---|---|---|---|---|---|---|
| Embodiment 4 | 358 | 66 | 2.64 | 3.43 | 165 | 4.8 | Variation of the tensile strength is smaller than 3%, and no abnormality exists on appearance | Variation of the tensile strength is smaller than 4%, and no abnormality exists on appearance |
| Embodiment 5 | 402 | 57 | 3.04 | 3.9 | 175 | 4.1 | Variation of the tensile strength is smaller than 3%, and no abnormality exists on appearance | Variation of the tensile strength is smaller than 4%, and no abnormality exists on appearance |
| Embodiment 6 | 384 | 67 | 2.84 | 4.1 | 156 | 3.9 | Variation of the tensile strength is smaller than 5%, and no abnormality exists on appearance | Variation of the tensile strength is smaller than 4%, and no abnormality exists on appearance |
| Comparative example 1 | 403 | 56 | 2.66 | 3.3 | 150 | 4.05 | Variation of the tensile strength is smaller than 4%, and abnormality exists on appearance | Variation of the tensile strength is no smaller than 2%, and no abnormality exists on appearance |
| Comparative example 2 | 334 | 64 | 2.45 | 3.18 | 130 | 4.1 | Variation of the tensile strength is smaller than 1%, and no abnormality exists on appearance | Variation of the tensile strength is smaller than 2%, and no abnormality exists on appearance |
| Comparative example 3 | 316 | 58 | 2.28 | 3.05 | 155 | 3.5 | Variation of the tensile strength is smaller than 2%, and no abnormality exists on appearance | Variation of the tensile strength is smaller than 3%, and no abnormality exists on appearance |

The above results show that, compared with the polyurethane catalysts provided by the comparative examples 1-3, the polyurethane catalysts provided by the embodiments 4-6 have higher catalytic activity and allow polymerization of polyether polyol and toluene diisocyanate to be completed faster under the same reaction conditions; and in addition, the polyurethane coatings prepared by using the polyurethane catalysts provided by the embodiments 4-6 have more favorable physical properties while catalytic activity is guaranteed: tensile force, tensile strength, tear strength, elongation at break and elastic modulus are higher, and the polyurethane composites prepared by using the polyurethane catalysts provided by the embodiments has better weatherability as deformation is small and no abnormality exists on appearance after thermal ageing treatment on a sealing material at a temperature of 90 DEG C. for 200 h.

Test Case 2

(1) Rigid polyurethane foam for thermal preservation of polyurethane household appliances is prepared by using the polyurethane catalysts provided by the embodiments 7-9 and the comparative example 4:

2 g of each of the catalysts provided by the embodiments 7-9 and the polyurethane catalyst provided by the comparative example 4 is uniformly mixed with 100 g of polyether polyol, 2 g of a silicone surfactant, 2 g of water and 13 g of cyclopentane in a stirred tank, then 150 g of polymeric MDI is added to obtain a mixture, the mixture is stirred at a temperature of 25 DEG C. with a stirring speed of 3000 pm/min for 5 seconds to obtain a product, and the product is poured into a mold with a temperature of 45 DEG C. for standing for 3-4 min until the reaction is completed to obtain the rigid polyurethane foam.

When the catalysts provided by the embodiments 7-9 are used to prepare the rigid polyurethane foam, reaction time for preparing the rigid polyurethane foam is 3 min; and when the catalyst provided by the comparative example 4 is used to prepare the rigid polyurethane foam, the rigid polyurethane foam meeting the industrial requirements can be prepared only when reaction time for polymerization is 4 min. Physical and mechanical properties of rigid polyurethane foam samples prepared by using the polyurethane catalysts provided by the embodiments 7-9 and the comparative example 4 are tested:

tensile strength, elongation at break and compressive strength of each sample are tested according to the National Light Industry Standard QBT2710-2005; and thermal conductivity coefficient of each sample is tested according to the National Standard GB/T10294-88, and bonding strength to a substrate ABS plate is determined. Results are shown in Table 6:

TABLE 6

|  | Elongation at break (%) | Tensile strength (KPa) | Compressive strength (KPa) | Thermal conductivity coefficient K value | Bonding strength to a substrate |
|---|---|---|---|---|---|
| Embodiment 7 | 13.6 | 7.9 | 156 | 19.3 | 12 |
| Embodiment 8 | 15.5 | 8.1 | 145 | 19.45 | 11.5 |
| Embodiment 9 | 16.2 | 8.5 | 152 | 19.22 | 12.1 |
| Comparative example 4 | 14.8 | 8.7 | 143 | 19.6 | 8.6 |

The above results show that, compared with the polyurethane catalyst provided by the comparative example 4, the polyurethane catalysts provided by the embodiments 7-9 have higher catalytic activity and allow polymerization of isocyanate and polyether polyol to be completed faster under the same reaction conditions; and in addition, the rigid polyurethane foam prepared by using the polyurethane catalysts provided by the embodiments 7-9 has more favorable physical properties while catalytic activity is guaranteed: compressive strength and bonding strength to a substrate are higher, the thermal conductivity is good, and other properties are not reduced.

(2) Rigid polyurethane spray foam is prepared by using the polyurethane catalysts provided by the embodiments 7-9 and the comparative example 6:

6 g of each of the catalysts of the embodiments 7-9 and the catalyst of the comparative example 6 is uniformly mixed with 80 g of benzoic anhydride polyester polyol, 90 g of polyether polyol, 20 g of dichlorofluoroethane, 4 g of a silicone surfactant, 10 g of water and 30 g of triethanolamine in a stirred tank to obtain a mixture A, then 260 g of polymethylenepolyphenyl isocyanate (polymeric MDI) is added into the mixture A to obtain a mixture, the mixture is stirred at a temperature of 20 DEG C. with a stirring speed of 3000 rpm/min for 5 seconds, and then the mixture stands until the reaction is completed to obtain the rigid polyurethane spray foam.

When the catalysts provided by the embodiments 7-9 are used to prepare the rigid polyurethane spray foam, reaction time for preparing the rigid polyurethane spray foam is 65 s; and when the catalyst provided by the comparative example 6 is used to prepare the rigid polyurethane spray foam, the rigid polyurethane spray foam meeting the industrial requirements can be prepared only when reaction time is 85 s.

If the mixture A is placed in an oven with a temperature of 50 DEG C. in a sealing manner for 3 weeks, and then polymeric MDI is added into the mixture A to prepare the rigid polyurethane spray foam, the rigid polyurethane spray foam can be prepared in 85 seconds by using the mixture A containing the catalysts provided by the embodiments 7-9 and the polymeric MDI; while the surface of the mixture A containing the catalyst provided by the comparative example 6 and the polymeric MDI are not dried within 180 s, so that it is indicated that compared with the catalyst provided by the comparative example 6, the catalysts provided by the embodiments 7-9 enable storage stability of the mixture A to be improved to a great extent.

Physical and mechanical properties of rigid polyurethane spray foam samples prepared by using the polyurethane catalysts provided by the embodiments 7-9 and the comparative example 6 are tested:

free foaming density of each sample is tested according to the National Standard GB/T6343-95, foam shrinkage rate of each sample is tested according to the National Standard GB/T8811-88, and reaction times of the mixture A before and after being stored in the oven with isocyanate. Results are shown in Table 7:

TABLE 7

|  | Cream time before storage in oven (s) | Surface drying time before storage in oven (s) | Cream time after storage in oven (s) | Surface drying time after storage in oven (s) | Foam density (g/ml) | Shrinkage rate after 24 h (%) |
|---|---|---|---|---|---|---|
| Embodiment 7 | 3 | 65 | 6 | 85 | 27 | <1 |
| Embodiment 8 | 3 | 63 | 7 | 88 | 27.5 | <1 |
| Embodiment 9 | 3 | 66 | 7 | 87 | 27.5 | <1 |
| Comparative example 6 | 4 | 85 | 8 | >180 | 29 | 3 |

The results show that, compared with the polyurethane catalyst provided by the comparative example 6, the polyurethane catalysts provided by the embodiments 7-9 has higher catalytic activity and allow polymerization of polymethylenepolyphenyl isocyanate and polyether polyol to be completed faster under the same reaction conditions; and in addition, after being placed in the oven with a temperature of 50 DEG C. for 3 weeks, the mixture A containing the catalysts of the embodiments 7-9 can be faster reacted with isocyanate to produce the rigid polyurethane spray foam, and it is indicated that the mixture A containing the catalysts provided by the embodiments 7-9 is higher in storage stability, and the catalysts are generally sold in the form of the mixture A in industry, so that the storage stability of the mixture A greatly influences practical construction; and the rigid polyurethane spray foam prepared by using the polyurethane catalysts provided by the embodiments 7-9 also has lower shrinkage rate and deformation degree.

(3) Polyether polyurethane soles are prepared by using the polyurethane catalysts provided by the embodiments 7-9 and the comparative example 5:

2 g of each of the catalysts provided by the embodiments 7-9 and the catalyst provided by the comparative example 5 is uniformly mixed with 100 g of polyether polyol with a functionality of 2 and a molecule weights of 4000, 12 g of ethylene glycol, 1 g of a silicone surfactant and 1.5 g of water in a stirred tank to obtain a mixture B, then 150 g of pure MDI and a prepolymer of the polyether polyol (NCO %=19) are added into the mixture B to obtain a mixture, the mixture is stirred at a temperature of 20 DEG C. with a stirring speed of 3000 r/min for 5 seconds to obtain a product, and the obtained product is transferred to a mold with a temperature of 45 DEG C. for standing for 4-6 min to obtain the polyether polyurethane sole material.

When the catalysts provided by the embodiments 7-9 are used to prepare the polyether polyurethane sole materials, reaction time for preparing the sole materials is 210 s; and when the catalyst provided by the comparative example 5 is adopted to prepare the polyether polyurethane sole, the polyether polyurethane sole meeting industrial requirements can be prepared only when reaction time is 300 s.

The mixture B is placed in a sealed oven with a temperature of 50 DEG C. for 3 weeks and then is subjected to a polymerization reaction with MDI to prepare the polyether polyurethane sole material, reaction speed of polymerization of the mixture B containing the catalysts provided by the embodiments 7-9 with the pure MDI can be basically kept before the placement, while reaction speed of polymerization of the mixture B containing the catalyst provided by the comparative example 5 with the pure MDI is obviously reduced. The results are shown in Table 8:

TABLE 8

| | Cream time before storage in oven (s) | Demolding time before storage in oven (s) | Cream time after storage in oven (s) | Demolding time after storage in oven (s) |
| --- | --- | --- | --- | --- |
| Embodiment 7 | 8 | 220 | 8 | 230 |
| Embodiment 8 | 8 | 230 | 8 | 245 |
| Embodiment 9 | 8 | 230 | 8 | 245 |
| Comparative example 5 | 9 | 250 | 11 | 360 |

Physical and mechanical properties of polyether polyurethane sole material samples prepared by using the polyurethane catalysts provided by the embodiments 7-9 and the comparative example 5 are tested: tensile strength of each sample is tested according to GB6344-96, elongation at break of each sample is tested according to GB/T6344-86, tear strength of each sample is tested according to the National Standard GB10808-89, and t flexing and fatigue resistance of each sample is tested according to the National Standard GB/T8812-88. Test results are shown in Table 9:

TABLE 9

| | Tensile strength (MPa) | Elongation at break (%) | Tear strength (MPa) | Bending, fatigue and fracture resistance (times) |
| --- | --- | --- | --- | --- |
| Embodiment 7 | 5.6 | 430 | 3.9 | >100 thousands |
| Embodiment 8 | 5.5 | 450 | 4 | >100 thousands |

TABLE 9-continued

| | Tensile strength (MPa) | Elongation at break (%) | Tear strength (MPa) | Bending, fatigue and fracture resistance (times) |
| --- | --- | --- | --- | --- |
| Embodiment 9 | 5.3 | 480 | 3.9 | >100 thousands |
| Comparative example 5 | 5.3 | 320 | 2.8 | >50 thousands |

The above results show that, compared with the polyurethane catalyst provided by the comparative example 5, the polyurethane catalysts provided by the embodiments 7-9 has higher catalytic activity and allow polymerization of polyether polyol and isocyanate to be completed faster under the same reaction conditions; and in addition, the polyether polyurethane sole material prepared by using the polyurethane catalysts provided by the embodiments 7-9 has more favorable physical properties while catalytic activity is guaranteed: tensile strength, elongation at break and tear strength are higher, and for flexing and fatigue resistance as an important index, the polyether polyurethane sole material prepared from the catalyst provided by the comparative example cannot meet the requirements of national standards.

Additionally, after standing the polyether polyurethane sole material in the oven with a temperature of 50 DEG C. for 3 weeks, the catalysts provided by the embodiments 7-9 can keep the original catalytic activity, while the catalytic activity of the catalysts provided by the comparative examples 4-6 is obviously reduced, and the index greatly influences the technology of manufacturing soles by using a polyurethane formula.

(4) Polyether polyurethane sole material is prepared by using the polyurethane catalysts provided by the embodiments 7-9 and the comparative example 5:

3 g of each of the catalysts provided by the embodiments 7-9 and the polyurethane catalyst provided by the comparative example 5 are uniformly mixed with 170 g of polyether polyol (the polyether polyol is a polymer formed by condensation of adipic acid having an average molecule weight Mn of 2000 with ethylene glycol and diethylene glycol), 25 g of ethylene glycol, 2 g of a silicone surfactant and 2 g of water in a stirred tank to obtain a mixture C, then 220 g of 4,4'-diphenylmethane diisocyanate (MDI) and a prepolymer of the polyether polyol (NCO %-18.5) are added into the mixture C to obtain a mixture, the mixture is stirred at a temperature of 40 DEG C. with a stirring speed of 3000 rpm/min for 5 s to obtain a product, and the obtained product is poured into a mold with a temperature of 50 DEG C. for 3-5 min until reaction is completed to obtain the polyether polyurethane sole material.

When the catalysts provided by the embodiments 7-9 are used to prepare the polyether polyurethane sole material, reaction time for preparing the sole material is 180 s; and when the catalyst provided by the comparative example 5 is used to prepare the polyether polyurethane sole material, the polyether polyurethane sole material meeting industrial requirements can be prepared only when polymerization reaction time is 260 s.

After the mixture C is placed in an oven with a temperature of 50 DEG C. in a sealing manner for 3 weeks, during polymerization of the mixture C containing the catalysts provided by the embodiments 7-9 and the MDI, reaction speed is slightly reduced, but during polymerization of the mixture C containing the catalyst provided by the comparative example 5 and the MDI, a sample cannot be formed. Results are shown in Table 10:

TABLE 10

|  | Cream time before storage in oven (s) | Demolding time before storage in oven (s) | Cream time after storage in oven (s) | Demolding time after storage in oven (s) |
|---|---|---|---|---|
| Embodiment 7 | 8 | 180 | 11 | 360 |
| Embodiment 8 | 8 | 180 | 11 | 400 |
| Embodiment 9 | 8 | 180 | 12 | 400 |
| Comparative example 5 | 9 | 260 | 20 | — |

Physical and mechanical properties of polyester polyurethane sole material samples prepared by using the polyurethane catalysts provided by the embodiments 7-9 and the comparative example 5 are tested: tensile strength of each sample is tested according to GB6344-96, elongation at break of each sample is tested according to GB/T6344-86, tear strength of each sample is tested according to the National Standard GB10808-89, and flexing and fatigue resistance of each sample are tested according to the National Standard GB/T8812-88. Test results are shown in Table 11:

TABLE 11

|  | Tensile strength (MPa) | Elongation at break (%) | Tear strength (MPa) | Bending, fatigue and fracture resistance (times) |
|---|---|---|---|---|
| Embodiment 7 | 9.6 | 430 | 7.8 | >100 thousands |
| Embodiment 8 | 9.5 | 450 | 7.9 | >100 thousands |
| Embodiment 9 | 9.5 | 400 | 7.8 | >100 thousands |
| Comparative example 5 | 9.3 | 400 | 7.1 | >100 thousands |

Test Case 3

(1) Ordinary flexible polyurethane foam plastics are prepared by using the polyurethane catalysts provided by the embodiments 4-6 and the comparative examples 4-6:

0.21 g of each polyurethane catalyst of the embodiments 4-6 and the comparative examples 4-6 is uniformly mixed with 100 g of polyether polyol, 3.55 g of water, 1.12 g of a foam stabilizer, 5 g of dichloromethane and 0.2 g of stannous octoate in a stirred tank, then 47 g of toluene diisocyanate (TDI) is added to obtain a mixture, the mixture is stirred at a temperature of 27 DEG C. with a stirring speed of 2100 rpm/min for 5 s to obtain a product, and the obtained product is transferred into a foaming tank until the reaction is completed to obtain the ordinary flexible polyurethane foam plastic.

Physical and mechanical properties of ordinary flexible polyurethane foam plastic samples prepared by using the polyurethane catalysts provided by the embodiments 4-6 and the comparative examples 4-6 are tested:

density of each sample is tested according to the National Standard GB6343-1995; elongation and tear strength of each sample are tested according to the Flexible Polyurethane Foam Plastic National Standard GB/T6344-1996; resilience rate of each sample is tested according to the Flexible Polyurethane Foam Plastic National Standard GB/T6770-2008; and collapsed hardness of each sample is tested according to the Flexible Polyurethane Foam Plastic National Standard GB/T10807-2006B. Results are shown in Table 12:

TABLE 12

|  | Foam jumping time (s) | Foam density (kg/m$^3$) | Resilience rate (%) | Elongation (%) | 65% collapsed hardness (N) | Tear strength (N/MM) |
|---|---|---|---|---|---|---|
| Embodiment 4 | 113 | 23.24 | 38 | 292.31 | 142.43 | 0.435 |
| Embodiment 5 | 112 | 23.43 | 37 | 289.78 | 143.29 | 0.441 |
| Embodiment 6 | 113 | 23.39 | 38 | 287.45 | 144.38 | 0.437 |
| Comparative example 4 | 110 | 23.15 | 35 | 258.72 | 156.42 | 0.409 |
| Comparative example 5 | 109 | 23.28 | 36 | 257.89 | 157.45 | 0.413 |
| Comparative example 6 | 109 | 23.19 | 35 | 256.74 | 156.96 | 0.415 |

The above results show that, compared with the polyurethane catalysts provided by the embodiments 4-6, the polyurethane catalysts provided by the embodiments 7-9 has higher catalytic activity and allow polymerization of polyester polyol and isocyanate to be completed faster under the same reaction condition; and in addition, the polyether polyurethane sole material prepared by using the polyurethane catalysts provided by the embodiments 7-9 has more favorable physical properties while catalytic activity is guaranteed: tensile strength, elongation at break and tear strength are higher and bending fatigue resistance is good. Additionally, after standing the polyether polyurethane sole material in the oven with the temperature of 50 DEG C. for 3 weeks, catalytic activity of the catalysts provided by the embodiments 7-9 is slightly reduced only, but formed polyether polyurethane sole material cannot be prepared by using the catalyst provided by the comparative example 5.

The above results show that, compared with the polyurethane catalysts provided by the comparative examples 4-6, the polyurethane catalysts provided by the embodiments 4-6 have better catalytic activity and allow the whole foaming reaction to be successfully completed within nearly same foaming time under the same reaction conditions; and in addition, the ordinary flexible polyurethane foam plastics prepared by using the polyurethane catalysts provided by the embodiments 4-6 have more favorable physical properties while the catalytic activity is guaranteed: resilience rate, elongation and tensile strength are all kept at higher levels, the collapsed hardness is lower, the foam density is moderate, and the relatively-low collapsed hardness and moderate foam density ensure that the high-resilience flexible polyurethane foam plastics have better hand feeling and resilience, and in addition, the obtained high-resilience flexible polyurethane foam plastics are also better in opening performance.

Appearance states of ordinary flexible polyurethane foam plastic samples prepared by using the polyurethane catalysts provided by the embodiments 4-6 and comparative examples 4-6 in different time durations are observed, and results are shown in Table 13:

TABLE 13

| Appearance | Time | | | |
|---|---|---|---|---|
| No | 2 months | 4 months | 6 months | 12 months |
| Embodiment 4 | Non discoloring | Non discoloring | Non discoloring | Non discoloring |
| Embodiment 5 | Non discoloring | Non discoloring | Non discoloring | Non discoloring |
| Embodiment 6 | Non discoloring | Non discoloring | Non discoloring | Non discoloring |
| Comparative example 4 | Non discoloring | Non discoloring | yellow | yellow |
| Comparative example 5 | Non discoloring | yellow | yellow | yellow |
| Comparative example 6 | Non discoloring | yellow | yellow | yellow |

The above results show that, the ordinary flexible polyurethane foam plastic samples prepared by using the polyurethane catalysts provided by the embodiments 4-6 have good yellowing resistance and will not discolor even after being placed for 12 months, so that the appearance of light-color products is not destroyed.

(2) High-resilience flexible polyurethane foam plastics are prepared by using the polyurethane catalysts provided by the embodiments 4-6 and the comparative examples 4-6:

0.07 g of each catalyst of the embodiments 4-6 and the comparative examples 4-6 is uniformly mixed with 70 g of high-activation polyether polyol, 30 g of polyurea polyol, 2 g of diethanolamine, 2.3 g of water, 0.69 g of a foam homogenizing agent and 0.14 g of stannous octoate in a stirred tank, then 33 g of toluene diisocyanate (TDI) is added to obtain a mixture, the mixture is stirred at a temperature of 27 DEG C. with a stirring speed of 2100 rpm/min for 3 s, and the mixture added into a foaming tank until a foaming reaction is completed to obtain the high-resilience flexible polyurethane foam plastics.

Physical and mechanical properties of high-resilience flexible polyurethane foam plastic samples prepared by using the polyurethane catalysts provided by the embodiments 4-6 and the comparative examples 4-6 are tested: density of each sample is tested according to the National Standard GB6343-1995; elongation and tear strength of each sample are tested according to the Flexible Polyurethane Foam Plastic National Standard GB/T6344-1996; resilience rate of each sample is tested according to the Flexible Polyurethane Foam Plastic National Standard GB/T6770-2008; and collapsed hardness of each sample is tested according to the Flexible Polyurethane Foam Plastic National Standard GB/T10807-2006B. Results are shown in Table 14:

TABLE 14

| | Foam jumping time (s) | Foam density (kg/m$^3$) | Resilience rate (%) | Elongation (%) | 65% collapsed hardness (N) | Tear strength (N/MM) |
|---|---|---|---|---|---|---|
| Embodiment 4 | 187 | 36.59 | 64 | 268.12 | 172.67 | 0.536 |
| Embodiment 5 | 186 | 36.63 | 65 | 269.45 | 173.76 | 0.541 |
| Embodiment 6 | 189 | 36.48 | 65 | 264.68 | 173.88 | 0.538 |
| Comparative example 4 | 197 | 36.23 | 62 | 238.52 | 186.42 | 0.487 |
| Comparative example 5 | 194 | 36.34 | 61 | 237.83 | 187.46 | 0.493 |
| Comparative example 6 | 197 | 36.19 | 59 | 237.78 | 186.56 | 0.489 |

The above results show that, compared with the polyurethane catalysts provided by the comparative examples 4-6, the polyurethane catalysts provided by the embodiments 4-6 have higher catalytic activity and allow the reaction for preparing the high-resilience flexible polyurethane foam plastics to be completed faster within nearly same foaming time under the same reaction condition; and in addition, the high-resilience flexible polyurethane foam plastics prepared by using the polyurethane catalysts provided by the embodiments 4-6 have more favorable physical properties while the catalytic activity is guaranteed: resilience rate, elongation and the tensile strength are all kept at higher levels, collapsed hardness is lower, the foam density is moderate, and the relatively-low collapsed hardness and moderate foam density ensure that the high-resilience flexible polyurethane foam plastics have better hand feeling and resilience, and in addition, the obtained high-resilience flexible polyurethane foam plastics are also better in opening performance.

Appearance states of high-resilience flexible polyurethane foam plastic samples prepared by using the polyurethane catalysts provided by the embodiments 4-6 and comparative examples 4-6 in different time durations are observed, and results are shown in Table 15:

TABLE 15

| Appearance No | Time | | | |
|---|---|---|---|---|
| | 2 months | 4 months | 6 months | 12 months |
| Embodiment 4 | Non discoloring | Non discoloring | Non discoloring | Non discoloring |
| Embodiment 5 | Non discoloring | Non discoloring | Non discoloring | Non discoloring |
| Embodiment 6 | Non discoloring | Non discoloring | Non discoloring | Non discoloring |
| Comparative example 4 | Non discoloring | yellow | yellow | yellow |
| Comparative example 5 | Non discoloring | yellow | yellow | yellow |
| Comparative example 6 | Non discoloring | yellow | yellow | yellow |

The above results show that, the high-resilience flexible polyurethane foam plastics samples prepared by using the polyurethane catalysts provided by the embodiments 4-6 have good yellowing resistance and will not discolor even after being placed for 12 months, so that the appearance of light-color products is not destroyed.

(3) Flexible polyurethane foam plastics added with calcium carbonate powder are prepared by using the polyurethane catalysts provided by the embodiments 4-6 and the comparative examples 4-6:

0.3 g of each catalyst provided by the embodiments 4-6 and the comparative examples 4-6 is uniformly mixed with 100 g of polyether polyol, 50 g of calcium carbonate, 4 g of water, 1.3 g of a foam homogenizing agent, 0.1 g of glycerol, 10 g of dichloromethane and 0.22 g of stannous octoate in a stirred tank, then 55 g of toluene diisocyanate (TDI) is added to obtain a mixture, the mixture is stirred at a temperature of 27 DEG C. with a stirring speed of 2100 rpm/min for 3 s, and the mixture is added into a foaming tank until a foaming reaction is completed to obtain the flexible polyurethane foam plastics added with calcium carbonate powder.

Physical and mechanical properties of flexible polyurethane foam plastics samples added with calcium carbonate powder, prepared by using the polyurethane catalysts provided by the embodiments 4-6 and the comparative examples 4-6 are tested:

density of each sample is tested according to the National Standard GB6343-1995; elongation and tear strength of each sample are tested according to the Flexible Polyurethane Foam Plastic National Standard GB/T6344-1996; resilience rate of each sample is tested according to the Flexible Polyurethane Foam Plastic National Standard GB/T6770-2008; and collapsed hardness of each sample is tested according to the Flexible Polyurethane Foam Plastic National Standard GB/T10807-2006B. Results are shown in Table 16:

TABLE 16

| | Foam jumping time (s) | Foam density (kg/m$^3$) | Resilience rate (%) | Elongation (%) | 65% collapsed hardness (N) | Tear strength (N/MM) |
|---|---|---|---|---|---|---|
| Embodiment 4 | 123 | 25.59 | 31 | 110.12 | 243.67 | 0.357 |
| Embodiment 5 | 124 | 25.73 | 30 | 111.23 | 245.71 | 0.363 |
| Embodiment 6 | 124 | 25.61 | 32 | 114.51 | 243.34 | 0.372 |
| Comparative example 4 | 127 | 25.15 | 28 | 96.83 | 258.45 | 0.332 |
| Comparative example 5 | 129 | 25.27 | 30 | 98.12 | 254.61 | 0.324 |
| Comparative example 6 | 128 | 24.92 | 28 | 95.42 | 255.77 | 0.328 |

The above results show that, compared with the polyurethane catalysts provided by the comparative examples 4-6, the polyurethane catalysts provided by the embodiments 4-6 have better catalytic activity, and the flexible polyurethane foam plastics added with calcium carbonate powder can be obtained within nearly same foaming time under the same reaction conditions without phenomena of cracking and generating yellow cores; and besides, the flexible polyurethane foam plastics added with calcium carbonate powder, prepared by using the polyurethane catalysts provided by the embodiments 4-6, have more favorable physical properties: elongation, resilience rate and tear strength are higher, collapsed hardness is lower, foam plastics does not have the phenomena of cracking and generating yellow cores while the opening performance is guaranteed, and lower collapsed hardness ensures that the high-resilience flexible polyurethane foam plastic has better hand feeling and resilience.

Appearance states of flexible polyurethane foam plastic samples added the calcium carbonate powder, prepared by using the polyurethane catalysts provided by the embodiments 4-6 and the comparative examples 4-6, within different time durations are observed, and the results as shown in Table 17:

TABLE 17

| Appearance No | Time | | | |
|---|---|---|---|---|
| | 2 months | 4 months | 6 months | 12 months |
| Embodiment 4 | Non discoloring | Non discoloring | Non discoloring | Non discoloring |
| Embodiment 5 | Non discoloring | Non discoloring | Non discoloring | Non discoloring |
| Embodiment 6 | Non discoloring | Non discoloring | Non discoloring | Non discoloring |
| Comparative example 4 | Non discoloring | yellow | yellow | yellow |
| Comparative example 5 | Non discoloring | yellow | yellow | yellow |
| Comparative example 6 | Non discoloring | yellow | yellow | yellow |

The above results show that, the flexible polyurethane foam plastic samples added with calcium carbonate powder, prepared by using the polyurethane catalysts provided by the embodiments 4-6 have good yellowing resistance and will not discolor even after being placed for 12 months, so that the appearance of the light-color products is not destroyed.

(4) High-density flexible polyurethane foam plastics are prepared by using the polyurethane catalysts provided by the embodiments 4-6 and the comparative examples 4-6:

0.22 g of each polyurethane catalyst of the embodiments 4-6 and the comparative examples 4-6 is uniformly mixed with 100 g of polyether polyol, 2.2 g of water, 0.8 g of a foam homogenizing agent and 0.08 g of stannous octoate in a stirred tank, then 33 g of toluene diisocyanate (TDI) is added to obtain a mixture, the mixture is stirred at a temperature of 27 DEG C. with a stirring speed of 2100 rpm/min for 3 s, and the mixture is added into a foaming tank until a foaming reaction is completed to obtain the high-density flexible polyurethane foam plastics with a density of at least 40 $Kg/m^3$.

Physical and mechanical properties of high-density flexible polyurethane foam plastic samples prepared by using the polyurethane catalysts provided by the embodiments 4-6 and the comparative examples 4-6 are tested:

density of each sample is tested according to the National Standard GB6343-1995; elongation and tear strength of each sample are tested according to the Flexible Polyurethane Foam Plastic National Standard GB/T6344-1996; resilience rate of each sample is tested according to the Flexible Polyurethane Foam Plastic National Standard GB/T6770-2008; and collapsed hardness of each sample is tested according to the Flexible Polyurethane Foam Plastic National Standard GB/T10807-2006B. Results are shown in Table 18:

TABLE 18

| | Foam jumping time (s) | Foam density (Kg/m3) | Resilience rate (%) | Elongation (%) | 65% collapsed hardness (N) | Tear strength (N/MM) |
|---|---|---|---|---|---|---|
| Embodiment 4 | 209 | 40.57 | 45 | 200.45 | 260.37 | 0.407 |
| Embodiment 5 | 208 | 40.55 | 44 | 201.34 | 262.56 | 0.395 |
| Embodiment 6 | 208 | 40.74 | 46 | 201.71 | 263.34 | 0.388 |
| Comparative example 4 | 192 | 39.87 | 43 | 205.39 | 258.15 | 0.367 |
| Comparative example 5 | 196 | 40.14 | 44 | 204.13 | 252.39 | 0.381 |
| Comparative example 6 | 195 | 40.25 | 42 | 205.87 | 254.59 | 0.374 |

The above results show that, compared with the polyurethane catalysts provided by the comparative examples 4-6, the polyurethane catalysts provided by the embodiments 4-6 have more favorable catalytic activity, and the high-density flexible polyurethane foam plastics can be obtained within nearly same foaming time under the same reaction conditions without phenomena of cracking and generating yellow cores; and in addition, the high-density flexible polyurethane foam plastics prepared by using the polyurethane catalysts provided by the embodiments 4-6 have more favorable physical properties while the catalytic activity is guaranteed: density, larger resilience rate, elongation and tear strength are higher, collapsed hardness is low and hand feeling is soft.

Appearance states of high-density flexible polyurethane foam plastic samples prepared by using the polyurethane catalysts provided by the embodiments 4-6 and comparative examples 4-6 within different time durations are observed, and results are shown in Table 19:

TABLE 19

| Appearance | Time | | | |
|---|---|---|---|---|
| No | 2 months | 4 months | 6 months | 12 months |
| Embodiment 4 | Non discoloring | Non discoloring | Non discoloring | Non discoloring |
| Embodiment 5 | Non discoloring | Non discoloring | Non discoloring | Non discoloring |
| Embodiment 6 | Non discoloring | Non discoloring | Non discoloring | Non discoloring |
| Comparative example 4 | Non discoloring | yellow | yellow | yellow |
| Comparative example 5 | Non discoloring | yellow | yellow | yellow |
| Comparative example 6 | Non discoloring | yellow | yellow | yellow |

The above results show that, the high-density flexible polyurethane foam plastic samples prepared by using the polyurethane catalysts provided by the embodiments 4-6 have good yellowing resistance and will not discolour even after being placed for 12 months, so that the appearance of light-color product sis not destroyed.

(5) Slow-resilience flexible polyurethane foam plastics are prepared by using the polyurethane catalysts provided by the embodiments 4-6 and the comparative examples 4-6:

0.2 g of each polyurethane catalyst of the embodiments 4-6 and the comparative examples 4-6 is uniformly mixed with 80 g of polyether polyol, 20 g of polymer polyol, 1.3 g of water, 0.7 g of silicone oil, 1 g of a pore-forming agent (DOW-1421) and 0.1 g of dibutyl-tin dilaurate in a stirred tank, then 38 g of toluene diisocyanate (TDI) is added to obtain a mixture, the mixture is stirred at a temperature of 27 DEG C. with a stirring speed of 2100 rpm/min for 3 s, and the mixture is added into a foaming tank until a foaming reaction is completed to obtain the slow-resilience flexible polyurethane foam plastics.

Physical and mechanical properties of slow-resilience flexible polyurethane foam plastic samples prepared from the polyurethane catalysts provided by the embodiments 4-6 and the comparative examples 4-6 are tested:

density of each sample is tested according to the National Standard GB6343-1995; elongation and tear strength of each sample are tested according to the Flexible Polyurethane Foam Plastic National Standard GB/T6344-1996; resilience rate of each sample is tested according to the Flexible Polyurethane Foam Plastic National Standard GB/T6770-2008; collapsed hardness of each sample is tested according to the Flexible Polyurethane Foam Plastic National Standard GB/T10807-2006B; and air permeability of each sample is tested according to Eupolymer Poroelastic Material Air Permeability National Standard GB/T10655-2003. Results are shown as Table 20:

TABLE 20

| | Foam jumping time (s) | Foam density (kg/m3) | Air permeability (Pa) | Elongation (%) | 25% collapsed hardness (N) | Tear strength (N/MM) |
|---|---|---|---|---|---|---|
| Embodiment 4 | 67 | 57.65 | 0.76 | 205.67 | 97.54 | 0.317 |
| Embodiment 5 | 69 | 56.81 | 0.73 | 204.81 | 96.81 | 0.325 |
| Embodiment 6 | 72 | 57.35 | 0.75 | 206.92 | 97.53 | 0.311 |
| Comparative example 4 | 75 | 56.62 | 0.81 | 194.65 | 120.64 | 0.293 |
| Comparative example 5 | 78 | 57.18 | 0.96 | 197.53 | 116.58 | 0.271 |
| Comparative example 6 | 85 | 56.82 | 0.94 | 199.51 | 113.84 | 0.299 |

The above results show that, compared with the polyurethane catalysts provided by the comparative examples 4-6, the polyurethane catalysts provided by the embodiments 4-6 have higher catalytic activity, and reaction of preparation of the slow-resilience flexible polyurethane foam plastic is faster completed under the same reaction conditions; and in addition, the slow-resilience polyurethane foam plastics prepared by using the polyurethane catalysts provided by the embodiments 4-6 have more favorable physical properties while catalytic activity is guaranteed: elongation and tear strength are larger, and better opening performance is guaranteed under the condition of same dosage of the pore-forming agent.

Appearance states of the slow-resilience flexible polyurethane foam plastic samples prepared by using the polyurethane catalysts provided by the embodiments 4-6 and comparative examples 4-6 in different time durations are observed, and results are shown in Table 21:

TABLE 21

| Appearance No | Time | | | |
|---|---|---|---|---|
| | 2 months | 4 months | 6 months | 12 months |
| Embodiment 4 | Non discoloring | Non discoloring | Non discoloring | Non discoloring |
| Embodiment 5 | Non discoloring | Non discoloring | Non discoloring | Non discoloring |
| Embodiment 6 | Non discoloring | Non discoloring | Non discoloring | Non discoloring |
| Comparative example 4 | Non discoloring | yellow | yellow | yellow |
| Comparative example 5 | Non discoloring | yellow | yellow | yellow |
| Comparative example 6 | Non discoloring | yellow | yellow | yellow |

The above results show that, the slow-resilience flexible polyurethane foam plastic samples prepared by using the polyurethane catalysts provided by the embodiments 4-6 have good yellowing resistance and will not discolor even after being placed for 12 months, so that the appearance of light-color products is not destroyed.

Apparently, the described embodiments are merely for clearly explaining the examples, but not limitations to the embodiments. Other variations or changes in different forms can also be made on the basis of the above descriptions to those of ordinary skilled in the art. All the embodiments do not need to be and even cannot to be exhaustive herein. But, the apparent variations or changes extended therefrom still fall under the scope of the present invention.

The invention claimed is:

1. A polyurethane catalyst, comprising a sodium compound which accounts for 1-60 wt % by weight of the polyurethane catalyst; wherein the sodium compound is sodium hyaluronate.

2. The polyurethane catalyst according to claim 1, further comprising a nitrogen compound, which is a tertiary amine compound and/or a pyridine compound.

3. The polyurethane catalyst according to claim 2, wherein the nitrogen compound is selected from a group consisting of linear polyamine, heterocyclic polyamine, benzene ring polyamines and any combination thereof, and the nitrogen compound accounts for 5-70 wt % by weight of the polyurethane catalyst.

4. The polyurethane catalyst according to claim 3, wherein the nitrogen compound is selected from a group consisting of triethylenediamine, pentamethylenetriamine, 1,1'-[[3-(dimethylamino)propyl]imino]bis-2-propanol, pentamethyldiethylenetriamine, tetramethyldipropylenetriamine, N,N-dimethyl-1,3-propanediamine, 3-dimethylaminopropyl urea, (dimethylaminoethyl) ether, N,N-bi[3-(dimethylamino)propyl]-N',N'-dimethyl-1,3-propanediamine, hexadecyl amine, 2-[[3-(dimethylamino)propyl]methylamino]ethanol, 1,3,5-tris(3-(dimethylamino)propyl)-1,3,5-hexahydrotriazine, N,N-dimenthylethanolamine, N,N-dimethyl benzylamine, triethanolamine, diethanolamine, 1,8-diazabicyclo[5,4,0]undecenyl-7-ene, 6-dimethylamino-1-hexanol, N-methyldicyclohexylamine, cetylamine, tetramethylguanidine, 1-isobutyl-2-methylimidazole, 2-amino-α-[[2-(1,1-dimethylethoxy)-2-oxoethoxy]imino]-4-thiazoleacetic acid, O,O-diethyl thiophosphate anhydride, N-ethyl morpholine, N-methylmorpholine, benzylamine, di ethylaminoethanol, N,N'-diisopropylcarbodiimide, 1-ethyl-(3-dimethyllamino-propyl) carbodiimidehydrochloride, 1,2-dimethylimidazole, N-methylimidazole, 2,2-dimorpholinodiethylether, dimethyaminoethoxyethanol, 2-dimethylaminopyridine, 2,4-diaminopyrimidine, 4,5-diaminopyrimidine, 2-methylamino-pyridine, 4-dimethylaminopyridine, 2,4-bis(dimethylamino) pyrimidine-6-carboxylic acid, 1-(methylamino)-3-(4-methylpiperazine-1-yl)-2-propanol, amino piperazine hydrochloride, 2,2,4-trimethyl-1-oxa-4-aza-2-silacyclohexane, 1-(2-dimethylaminoethyl) piperazine, 1-(3-dimethylamino-propyl)-piperazine, (2-morpholinopyrid-4-yl) methanamine, 4-chloro-6-dimethylaminopyrimidine, N,N-dimethyl-1-(morpholin-2-yl) methanamine, N,N-dimethyl-1-[(2R)-morpholin-2-yl]methanamine, 4-methylmorpholine-2-methylamine, N,N-dimethyl(4-methyl-1-piperazinyl)ethanamine, hexahydro-1,3,5-trimethyl-S-triazin, 1,3,5-triethylhexahydro-S-triazine, N,N'-carbonyldiimidazole, dicyclohexylcarbodiimide, 3-(diethoxyphosphoryloxy), o-(7-azabenzotriazol-1-yl)-N, N,N',N'-te-tramethyluroniumhexafluorophosphate, N-hydroxy-7-azabenzotriazole, bromo-tris-pyrrolidino-phosphoniumhexafluorophosphate, O-(benzotriazol-1-yl)-N,N,N', N'-tetramethyluroniumtetrafluoroborate, O—(N-succinimido)-1,1,3,3-tetramethyluronium tetrafluoroborate and any combination thereof.

5. The polyurethane catalyst according to claim 4, wherein the nitrogen compound is selected from a group consisting of pentamethyldiethylenetriamine, 2-dimethylaminopyridine, N,N-dimethyl-1,3-propanediamine, triethylenediamine, 1,3,5-tris(3-(dimethylamino)propyl)-1,3,5-hexahydrotriazine, 1,8-diazabicyclo [5,4,0] undecenyl-7-ene, 2,2-dimorpholinodiethylether, (2-morpholinopyrid-4-yl)methanamine, 2,4-diaminopyrimidine, 1-(methylamino)-3-(4-methylpiperazine-1-yl)-2-propanol and any combination thereof.

6. The polyurethane catalyst according to claim 3, further comprising a potassium compound which accounts for 2-50 wt % by weight of the polyurethane catalyst.

7. The polyurethane catalyst according to claim 6, wherein the potassium compound accounts for 2-20 wt % by weight of the polyurethane catalyst.

8. The polyurethane catalyst according to claim 7, wherein the potassium compound is selected from a group consisting of potassium hydroxide, potassium carbonate, potassium bicarbonate, potassium caproate, potassium caprylate, potassium 2-ethylhexanoate, potassium neodecanoate, potassium caprate, potassium salicylate, potassium laurate, potassium citrate, potassium methoxide, potassium cellulose, potassium carboxymethylcellulose, potassium hyaluronate, potassium alginate, potassium gluconateand any combination thereof.

9. The polyurethane catalyst according to claim 8, wherein the potassium compound is from a group consisting of potassium laurate, potassium citrate, potassium alginate, potassium cellulose and any combination thereof.

10. The polyurethane catalyst according to claim 9, further comprising an organic solvent and a stabilizer, the organic solvent being represented by formula (1):

$$X-R-Y \qquad (1)$$

wherein R is an alkyl group of $C_{1\sim20}$, a polyether group represented by formula (2), a nitrogen-containing group represented by formula (3), a nitrogen-containing group represented by formula (4), amide represented by formula (5) or amide represented by formula (6);

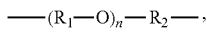 (2)

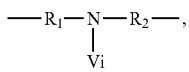 (3)

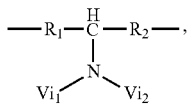 (4)

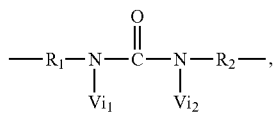 (5)

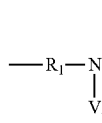 (6)

X and Y independently are H, OH, R or $R_1$;

$1 < n \leq 100$;

$R_1$ and $R_2$ independently are a linear, branched or cyclic, aliphatic or aromatic, saturated or unsaturated, unsubstituted or heteroatom-substituted hydrocarbon group having 1 to 10 carbon atoms; and $V_i$, $V_{i1}$ and $V_{i2}$ independently are a polyether group represented by formula (2).

* * * * *